(12) United States Patent
Koo et al.

(10) Patent No.: US 11,739,458 B2
(45) Date of Patent: Aug. 29, 2023

(54) ARTIFICIAL INTELLIGENCE WASHING MACHINE AND OPERATION METHOD THEREOF

(71) Applicant: LG ELECTRONICS INC., Seoul (KR)

(72) Inventors: Bonkwon Koo, Seoul (KR); Seungchul Cha, Seoul (KR); Sanghyun Lee, Seoul (KR); Hyunji Park, Seoul (KR)

(73) Assignee: LG Electronics Inc., Seoul (KR)

( * ) Notice: Subject to any disclaimer, the term of this patent is extended or adjusted under 35 U.S.C. 154(b) by 519 days.

(21) Appl. No.: 16/870,245

(22) Filed: May 8, 2020

(65) Prior Publication Data
US 2021/0207306 A1 Jul. 8, 2021

(30) Foreign Application Priority Data
Jan. 7, 2020 (KR) .................. 10-2020-0002070

(51) Int. Cl.
*D06F 33/70* (2020.01)
*D06F 34/18* (2020.01)
(Continued)

(52) U.S. Cl.
CPC .............. *D06F 33/70* (2020.02); *D06F 33/44* (2020.02); *D06F 33/54* (2020.02); *D06F 33/60* (2020.02); *D06F 33/62* (2020.02); *D06F 34/18* (2020.02); *D06F 34/28* (2020.02); *D06F 34/04* (2020.02); *D06F 34/06* (2020.02);
(Continued)

(58) Field of Classification Search
CPC .. D06F 33/44; D06F 2101/14; D06F 2105/56; D06F 33/70
See application file for complete search history.

(56) References Cited

U.S. PATENT DOCUMENTS

2001/0049948 A1* 12/2001 Jo .................. D06F 34/28
68/12.27
2003/0005524 A1* 1/2003 Hayes .............. D06F 34/28
68/12.01

FOREIGN PATENT DOCUMENTS

KR 2019107610 A * 9/2019 ............ D06F 33/00

OTHER PUBLICATIONS

Machine translation of KR-2019107610-A, dated Sep. 2019. (Year: 2019).*

* cited by examiner

*Primary Examiner* — Michael E Barr
*Assistant Examiner* — Kevin G Lee
(74) *Attorney, Agent, or Firm* — Fish & Richardson P.C.

(57) ABSTRACT

The present invention relates to an artificial intelligence washing machine and an operation method thereof. A method of operating a washing machine may comprise estimating, based on a previous setting of a previous washing operation, an estimated setting for a current washing operation, wherein the estimated setting includes a water supply time, a drainage time, and a spin-drying time, obtaining a user input, obtaining an amount of laundry from a weight sensor of the washing machine, determining, based on the estimated setting, the user input, and the amount of laundry, a washing time for the current washing operation and displaying the determined washing time to the user. Accordingly, the estimated washing time is provided with the reflection of data of the washing machine which has been accumulated by the increase of the number of uses, thereby reducing a difference between an actual operating time and the estimated washing time and minimizing the user inconvenience.

20 Claims, 14 Drawing Sheets

(51) Int. Cl.
  *D06F 34/28* (2020.01)
  *D06F 33/54* (2020.01)
  *D06F 33/60* (2020.01)
  *D06F 33/62* (2020.01)
  *D06F 33/44* (2020.01)
  *D06F 105/56* (2020.01)
  *D06F 34/06* (2020.01)
  *G05B 13/02* (2006.01)
  *D06F 103/04* (2020.01)
  *D06F 105/02* (2020.01)
  *D06F 105/08* (2020.01)
  *D06F 105/58* (2020.01)
  *D06F 34/04* (2020.01)
  *G06N 3/045* (2023.01)

(52) U.S. Cl.
  CPC ...... *D06F 2103/04* (2020.02); *D06F 2105/02* (2020.02); *D06F 2105/08* (2020.02); *D06F 2105/56* (2020.02); *D06F 2105/58* (2020.02); *G05B 13/027* (2013.01); *G06N 3/045* (2023.01)

FIG. 11

$$\begin{bmatrix} 3 & 0 & 0 & 1 & 0 & 0 & 0 & 0 & 0 & 0 & 0 \\ 3 & 0 & 0 & 0 & 1 & 0 & 0 & 0 & 0 & 0 & 0 \\ 4 & 0 & 0 & 0 & 1 & 0 & 0 & 0 & 0 & 0 & 0 \\ 2 & 0 & 0 & 1 & 0 & 0 & 0 & 0 & 0 & 0 & 0 \\ & & & & \vdots & & & & & & \\ 4 & 0 & 0 & 0 & 0 & 0 & 1 & 0 & 0 & 0 & 0 \\ 3 & 0 & 0 & 0 & 0 & 1 & 0 & 0 & 0 & 0 & 0 \\ 6 & 0 & 0 & 0 & 0 & 1 & 0 & 0 & 0 & 0 & 0 \\ 4 & 0 & 0 & 1 & 0 & 0 & 0 & 0 & 0 & 0 & 0 \end{bmatrix}$$

$$\begin{bmatrix} 3 & 1 & 0 & 0 & 0 & 0 \\ 3 & 1 & 0 & 0 & 0 & 0 \\ 4 & 1 & 0 & 0 & 0 & 0 \\ 2 & 1 & 0 & 0 & 0 & 0 \\ & & \vdots & & & \\ 4 & 1 & 0 & 0 & 0 & 0 \\ 3 & 0 & 1 & 0 & 0 & 0 \\ 6 & 1 & 0 & 0 & 0 & 0 \\ 4 & 1 & 0 & 0 & 0 & 0 \end{bmatrix}$$

$$\begin{bmatrix} 3 & 0 & 0 & 1 & 0 & 0 & 0 & 0 & 0 & 0 & 0 & 0 & 0 \\ 3 & 0 & 0 & 0 & 1 & 0 & 0 & 0 & 0 & 0 & 0 & 0 & 0 \\ 4 & 0 & 0 & 0 & 1 & 0 & 0 & 0 & 0 & 0 & 0 & 0 & 0 \\ 2 & 0 & 0 & 1 & 0 & 0 & 0 & 0 & 0 & 0 & 0 & 0 & 0 \\ & & & & & \vdots & & & & & & & \\ 4 & 0 & 0 & 0 & 0 & 0 & 1 & 0 & 0 & 0 & 0 & 0 & 0 \\ 3 & 0 & 0 & 0 & 0 & 1 & 0 & 0 & 0 & 0 & 0 & 0 & 0 \\ 6 & 0 & 0 & 0 & 0 & 1 & 0 & 0 & 0 & 0 & 0 & 0 & 0 \\ 4 & 0 & 0 & 1 & 0 & 0 & 0 & 0 & 0 & 0 & 0 & 0 & 0 \end{bmatrix}$$

↑ 1310    ↑ 1320

ARTIFICIAL INTELLIGENCE WASHING MACHINE AND OPERATION METHOD THEREOF

CROSS REFERENCE TO RELATED APPLICATION

The present application claims priority to Korean Patent Application No. 10-2020-0002070, filed on Jan. 7, 2020, the entire contents of which is incorporated herein for all purposes by this reference.

BACKGROUND

Various embodiments of the present disclosure relate to an artificial intelligence washing machine and an operation method thereof.

A washing machine washes laundry by using emulsification of detergent, the water flow caused by the rotation of the pulsator or washing tank, and the impact applied by the pulsator, etc. The washing machine performs processes of washing, rinsing, and spin-drying, so that contamination in the laundry is removed by using the action of detergent and water.

Meanwhile, with the development of the technology, devices having artificial intelligence (AI) is being widely introduced, and the washing machine uses the AI to seek efficiency of washing.

In general, when using the washing machine, the washing machine can determine processes to be performed automatically or based on user's commands and can provide a consequent estimated time to the user. Here, the washing machine can determine the estimated time based on a standard water supply time, a drainage time, a washing time, etc., which are set in advance when the washing machine is released. However, in an actual use environment, a deviation may occur due to various causes, so that washing may be performed for a period of time significantly different from the estimated time provided to the user, and such a difference may cause the user to feel inconvenient.

SUMMARY

In order to minimize user inconvenience, it is necessary to determine an estimated time in accordance with an actual use environment that the washing machine currently experiences and to provide the estimated time to the user.

Therefore, various embodiments of the present disclosure provide an artificial intelligence washing machine capable of classifying and recognizing abnormal conditions by monitoring a long-term washing process time of the washing machine through use of the artificial intelligence, and provide an operation method of the same.

Various embodiments of the present disclosure provide a method of the artificial intelligence washing machine, which is capable of determining a drainage time and a water supply time based on the actual use environment that the washing machine experiences and of determining an estimated washing time based on the pieces of determined time.

The technical problem to be overcome in this document is not limited to the above-mentioned technical problems. Other technical problems not mentioned can be clearly understood from the those described below by a person having ordinary skill in the art.

According to various embodiments of the present disclosure, a washing machine comprises an input device configured to receive user input, a weight sensor configured to sense an amount of laundry received in the washing machine, a driver configured to perform operations including water supply, drainage, washing, and spin-drying in the washing machine, an output device configured to provide washing machine status information and washing time information and at least one processor that is in communication with the driver, the input device, the weight sensor and the output device wherein the at least one processor is configured to estimate, based on a previous setting of a previous washing operation, an estimated setting for a current washing operation, wherein the estimated setting includes a water supply time, a drainage time, and a spin-drying time, obtain the user input through the input device, obtain the amount of laundry from the weight sensor and determine, based on the estimated setting, the user input, and the amount of laundry, a washing time for the current washing operation.

According to various embodiments of the present disclosure, a method of operating a washing machine may comprise estimating, based on a previous setting of a previous washing operation, an estimated setting for a current washing operation, wherein the estimated setting includes a water supply time, a drainage time, and a spin-drying time, obtaining a user input, obtaining an amount of laundry from a weight sensor of the washing machine, determining, based on the estimated setting, the user input, and the amount of laundry, a washing time for the current washing operation and displaying the determined washing time to the user.

According to various embodiments, an estimated washing time is provided with the reflection of data of the washing machine which has been accumulated by the increase of the number of uses, thereby reducing a difference between an actual operating time and the estimated washing time and minimizing the user inconvenience.

According to various embodiments, the accuracy of the classification of abnormality or breakdown can be enhanced by classifying causes of the difference from a standard setting operating condition.

According to various embodiments, whether to visit a service center can be provided based on a collected product usage data. In the case of visiting, the number of revisiting is reduced by improving part preparation and accuracy at the service center, so that the user inconvenience can be reduced.

According to various embodiments, the reliability of the product can be increased by providing both accurate analysis of the cause of the breakdown or abnormality and solutions thereto.

Advantageous effects that can be obtained from the present disclosure is not limited to the above-mentioned effects. Further, other unmentioned effects can be clearly understood from the following descriptions by those skilled in the art to which the present disclosure belongs.

BRIEF DESCRIPTION OF THE DRAWINGS

FIG. 11 is a view showing an example of a learning data for training an artificial neural network model for determining an estimated water supply time in accordance with various embodiments of the present disclosure;

FIG. 12 is a view showing an example of a learning data for training the artificial neural network model for determining an estimated drainage time in accordance with various embodiments of the present disclosure;

FIG. 13 is a view showing an example of a learning data for training the artificial neural network model for determining an estimated spin-drying time in accordance with various embodiments of the present disclosure;

With regard to the description of the drawings, the same or similar reference numerals may be used for the same or similar components.

DETAILED DESCRIPTION OF THE DISCLOSURE

Figure 1:
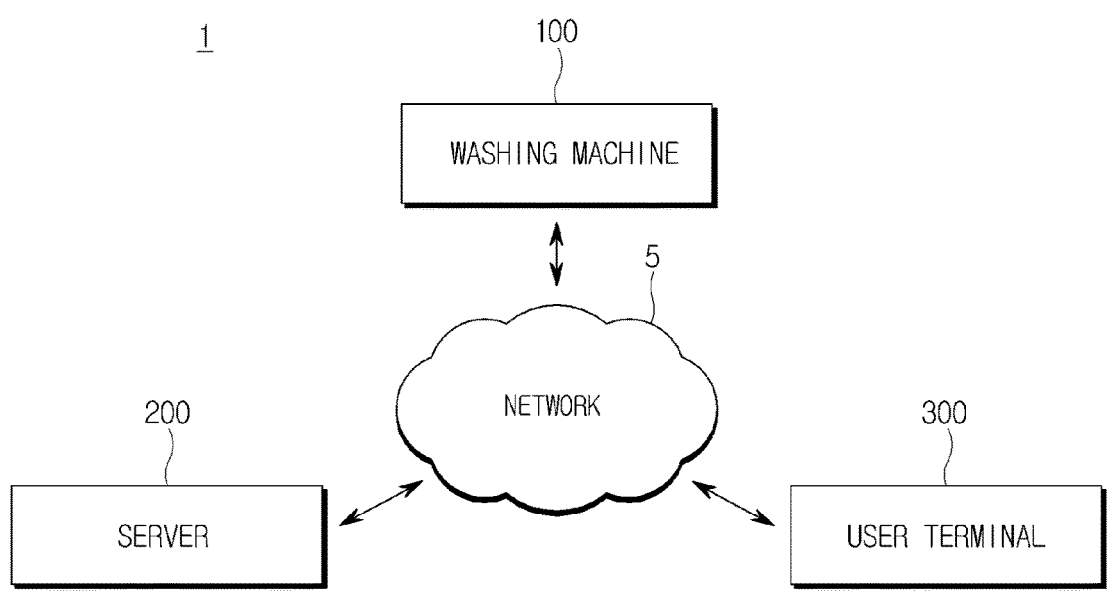
FIG. 1 is a view showing a system according to various embodiments of the present disclosure.

Hereinafter, embodiments disclosed in this specification will be described in detail with reference to the accompanying drawings. The same or similar elements will be denoted by the same reference numerals irrespective of drawing numbers, and repetitive descriptions thereof will be omitted.

A suffix "module" or "part" for the component, which is used in the following description, is given or mixed in consideration of only convenience for ease of specification, and does not have any distinguishing meaning or function per se. Also, the "module" or "part" may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present disclosure may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC). The ASIC may be resident within a user's terminal.

In the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present disclosure are understood to be included in the accompanying drawings.

While terms including ordinal numbers such as the first and the second, etc., can be used to describe various components, the components are not limited by the terms mentioned above. The terms are used only for distinguishing between one component and other components.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

A washing machine according to various embodiments of the present disclosure may include a household washing machine, an industrial washing machine, and a commercial washing machine, etc. Hereinafter, various embodiments of the present disclosure will be described with reference to an example of the household washing machine that is mainly used in home.

FIG. 1 is a view showing a system 1 according to various embodiments of the present disclosure.

Typically, an artificial intelligence washing machine 100 has a built-in processor having artificial intelligence functions, and may be used independently. Also, referring to FIG. 1, the system 1 may be formed through a network 5 and may be used in conjunction with a server 200 and a user terminal 300.

Here, the network 5 may use wireless communication technologies including a 2G network such as Global System for Mobile Communication (GSM) and a Code Division Multi Access (CDMA), a 3G network such as a wideband CDMA (WCDMA), a 4G network such as a Long Term Evolution (LTE) network, a 5G Network, Wireless LAN (WLAN), Wireless-Fidelity (Wi-Fi), Dedicated Short Range Communication (DSRC), Bluetooth™, Radio Frequency Identification (RFID), Infrared Data Association (IrDA), ZigBee, and Near Field Communication (NFC).

The devices 100 and 200 constituting the system 1 may be connected to each other through the network 5. According to the embodiment, the devices 100 and 200 may communicate with each other through a base station or an access point (AP), and may also communicate directly with each other without going through the base station or AP.

The server 200 may include an AI server performing artificial intelligence processing and a big data server performing operations on big data. Also, one server 200 may have both an artificial intelligence processing function and a big data processing operation function.

The server 200 may include a web server or an application server that enables the remote control of the operation of the washing machine 100 by using a washing machine driving application or a driving web browser installed in the user terminal 300.

The server 200 may be connected to the artificial intelligence washing machine 100 constituting the system 1 through the network 5 and may support at least a portion of the artificial intelligence processing of the connected washing machine 100.

The server 200 instead of the artificial intelligence washing machine 100 may generate an artificial neural network model (hereinafter, referred to as a learning model) obtained by training an artificial neural network in accordance with a machine learning algorithm, and may directly store the learning model or transmit to the artificial intelligence washing machine 100.

The server 200 may receive input data from the artificial intelligence washing machine 100, infer a result value for the received input data by using the learning model, generate a response or a control command based on the inferred result value to transmit it to the artificial intelligence washing machine 100. According to other embodiments, the artificial intelligence washing machine 100 may infer the result value for the input data by directly using the learning model and may generate a response or a control command based on the inferred result value.

The user terminal 300 may include, for example, a mobile phone, a smart phone, a tablet PC, an ultrabook, a laptop computer, a personal computer, a wearable device (e.g., a watch type artificial intelligence device (a smartwatch)), a glass type artificial intelligence device (smart glasses), a head mounted display (HMD), an artificial intelligence speaker, etc. However, the user terminal 300 is not limited to this.

The user terminal 300 may install the washing machine driving application or the driving web browser. By using this, the user terminal 300 may provide a control command to the washing machine 100 directly or through the server 200 and thus may operate the washing machine 100. Also, the user terminal 300 may receive operation statuses through the server 200 or directly from the washing machine 100.

Figure 2:
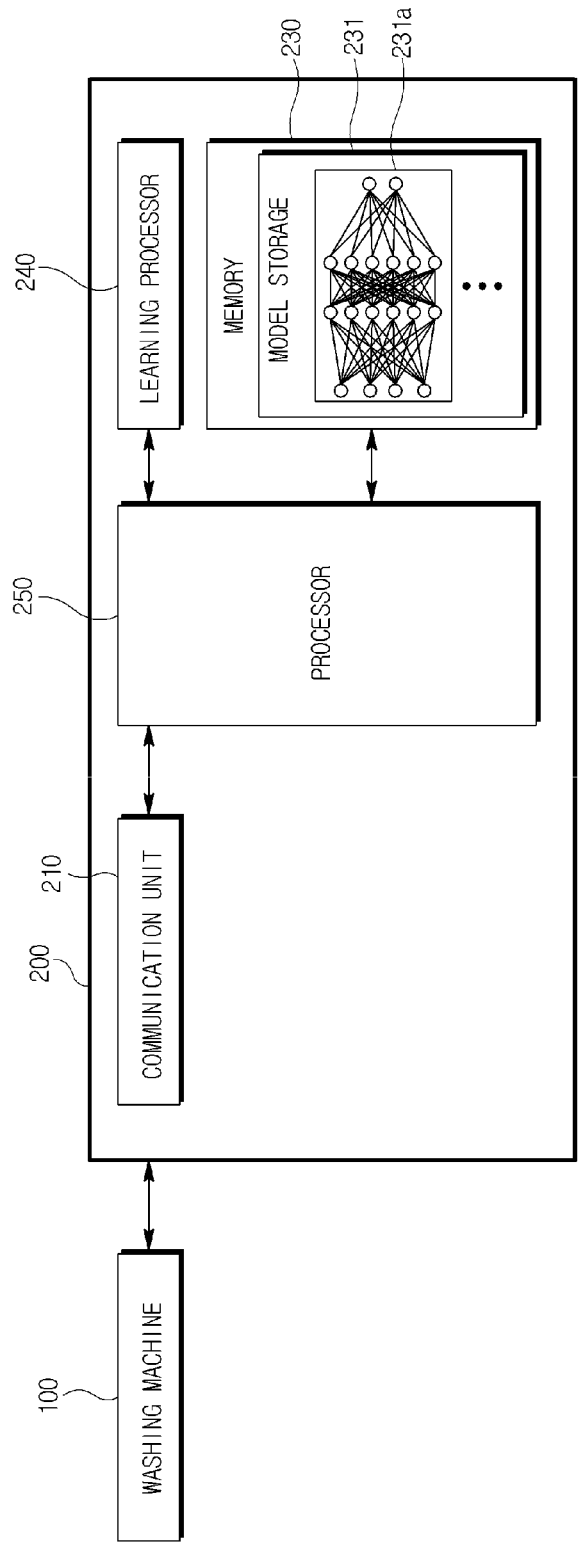
FIG. 2 is a view showing the configuration of a server according to various embodiments of the present disclosure.

FIG. 2 is a view showing the configuration of the server 200 according to various embodiments of the present disclosure.

Referring to FIG. 2, the server 200 may have artificial intelligence functions. The server 200 may mean a device which trains the artificial neural network model by using the machine learning algorithm or mean a device which uses the learning model, that is, the trained artificial neural network model. Here, the server 200 may be composed of a plurality of servers to perform distributed processing, or may be defined as a 5G network.

According to the embodiment, the server 200 may be included as a component of the washing machine 100. Also, the server 200, together with the washing machine 100, may perform at least a portion of the artificial intelligence processing. According to the embodiment, when the washing machine 100 has insufficient computing power, the washing machine 100 may request the server 200 to perform a part of or all the artificial intelligence processing. According to various embodiments, the server 200 may include a communication unit 210, a memory 230, a learning processor 240, and a processor 250.

The communication unit 210 may transmit and receive data to and from external devices including the washing machine 100 and the user terminal 300. According to the embodiment, the communication unit 210 may transmit and receive data to and from external devices through the network 5. According to another embodiment, the communication unit 210 may directly transmit and receive data to and from the external devices.

The memory 230 may include a model storage 231. The model storage 231 may store an artificial neural network model 231a which is being trained or has been trained through the learning processor 240. According to the embodiment, the memory 230 may include washing process information of the washing machine 100. Also, the memory 230 may store control commands for controlling the washing machine 100.

The memory 230 may include a magnetic storage media or a flash storage media. However, the scope of the present invention is not limited to this. The memory 230 may include an internal memory and/or an external memory and may include a volatile memory such as DRAM, SRAM, or SDRAM, a non-volatile memory such as one time programmable ROM (OTPROM), PROM, EPROM, EEPROM, mask ROM, flash ROM, NAND flash memory, or NOR flash memory, a flash drive such as SSDs, compact flash (CF) cards, SD cards, Micro-SD cards, Mini-SD cards, Xd cards, or memory sticks, or a storage device such as an HDD.

The learning processor 240 may generate a learning model obtained by training the artificial neural network model 231a through the use of learning data. The learning processor 240 may generate the learning model obtained by training the artificial neural network 231a through the use of learning data. The learning model may be used with being mounted on the server 200 or with being mounted on the external device such as the washing machine 100.

The learning model may be implemented in hardware, software, or by a combination of hardware and software. When the learning model is partially or wholly implemented in software, one or more instructions constituting the learning model may be stored in the memory 230.

The processor 260 may infer a result value for a new input data by using the learning model and may generate responses or control commands based on the inferred result value.

Figure 3:
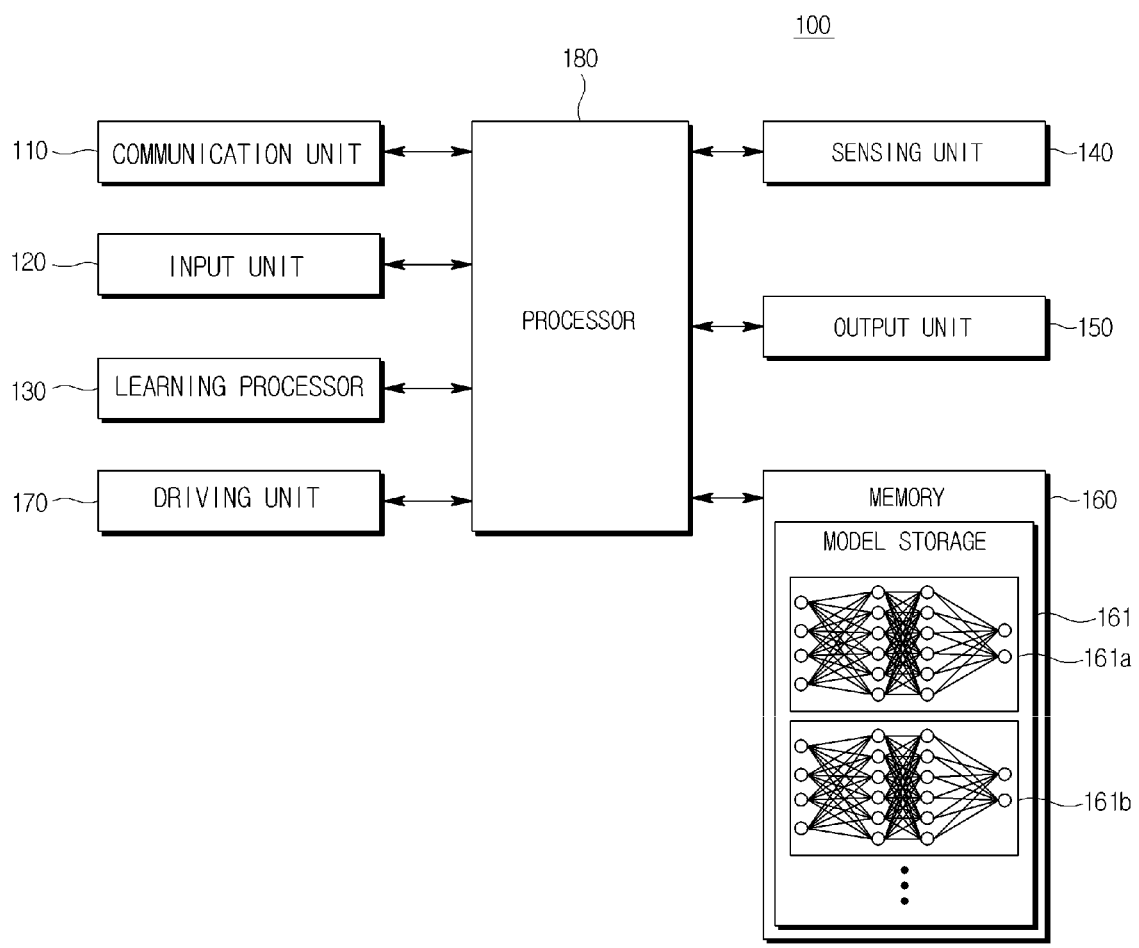
FIG. 3 is a schematic block diagram of an artificial intelligence washing machine according to various embodiments of the present disclosure.

FIG. 3 is a schematic block diagram of the artificial intelligence washing machine 100 according to various embodiments of the present disclosure.

Referring to FIG. 3, the washing machine 100 may include a communication unit 110, an input unit 120, a learning processor 130, a sensing unit 140, an output unit 150, a memory 160, a driving unit 170, and a processor 180.

According to various embodiments, the input unit 120 may receive a predetermined control command from a user. Here, the control command is, for example, washing start and end command, operation course of laundry (standard washing, speed wash, silent washing, color care, rinsing+ spin-drying, etc.), the number of rinsing, washing type, spin-drying strength, water temperature, etc.

The output unit 150 may display control information according to the control command input by the user or an operating state of the washing machine, for example, a washing setting, a washing process being currently performed, an estimated washing time, and a remaining washing time, etc. The output unit 150 may generate an output related to a visual sense or an auditory sense, etc. According to the embodiment, the output unit 150 may output data required by the user by using a display and/or LED which is provided on a control panel 123 and outputs visual information or by using a speaker outputting auditory information, etc.

Figure 4:
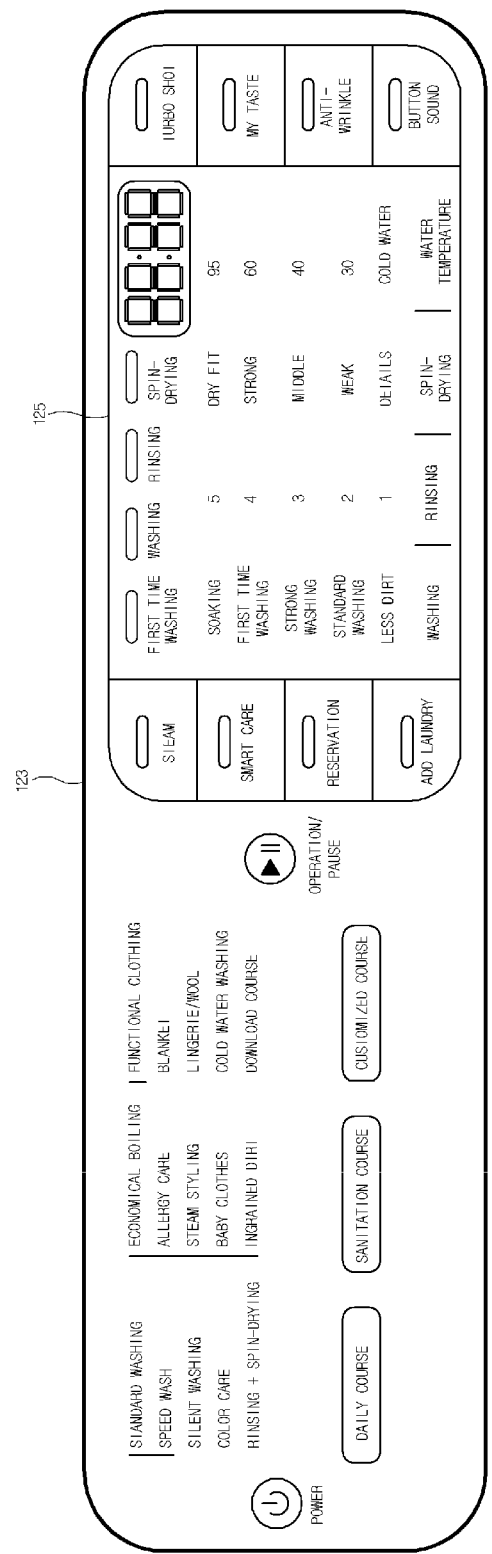
FIG. 4 is a view showing a control panel of the washing machine, which forms an input unit and an output unit according to the embodiment.

FIG. 4 is a view showing the control panel of the washing machine, which forms the input unit 120 and the output unit 150 according to the embodiment.

Referring to FIG. 4, the washing machine 100 may include the control panel 123 shown in FIG. 4 as the input unit 120 and the output unit 150. The control panel 123 may include various control input keys which allow the user to set the washing process. The user may use the control input keys on the control panel 123 of the washing machine 100, thereby causing various washing course processes preset in the washing machine 100 to be performed. Also, the user may cause the washing process to be performed as the user arbitrarily set the degree of how much each of washing, rinsing, and spin-drying is performed. In response to the user input, the washing machine 100 may determine an estimated time and display the estimated time on a time indicator 125 of the control panel 123. Alternatively, while performing the washing process based on the user input setting, the washing machine 100 may determine an estimated time until the completion of the washing process and display the estimated time on the time indicator 125 of the control panel 123.

According to various embodiments, the communication unit 110 may transmit and receive data to and from external devices such as the user terminal 300 or the server 200 by using wired and wireless communication technologies. For example, the communication unit 110 may transmit and receive sensor information, the user input, the learning model, a control signal, washing process execution information, etc., with the external devices.

According to the embodiment, the communication unit 110 may receive a remotely controlled washing process execution command from the user terminal 300 or the server 200. For example, through the remote use of the user terminal 300, the user may perform a task similar to what the user sets the washing process through the control panel 123 shown in FIG. 4. The user terminal may transmit directly or through the server 200 a washing process control command of the user to the washing machine 100. The washing machine 100 may receive the corresponding washing process control command through the communication unit 110 and perform the washing process accordingly.

In addition, the washing machine 100 may transmit the washing process status directly to the user terminal 300 through the communication unit 110 or to the user terminal 300 through the server 200. According to the embodiment, the washing machine 100 may transmit the corresponding output information to the user terminal 300 whenever controlling the output of the control panel 123 shown in FIG. 4. Here, the washing machine 100 may predict an estimated washing process execution time or a remaining washing process execution time according to the setting and transmit it to the user terminal 300.

The communication unit 110 may use wireless communication technologies including a Global System for Mobile communication (GSM), Code Division Multi Access (CDMA), Long Term Evolution (LTE), fifth generation communication (5G), Wireless LAN (WLAN), Wireless Fidelity (Wi-Fi), Dedicated Short Range Communication (DSRC), Bluetooth™, Radio Frequency Identification (RFID), Infrared Data Association (IrDA), ZigBee, and Near Field Communication (NFC) or wired communication technologies including Local Area Network (LAN), Wide Area Network (WAN), Metropolitan Area Network (MAN), and Ethernet.

According to various embodiments, the learning processor 130 may be configured to receive, classify, store, and output information to be used for data mining, data analysis, intelligent decision making, and machine learning algorithms and technologies.

The learning processor 130 may include one or more memory units configured to store data received, detected, sensed, generated, predefined, or in another way output by the washing machine 100 or data received, detected, detected, generated, predefined, or in another way output by another component, device, electronic device or a device communicating with the electronic device.

The learning processor 130 may include a memory integrated with or implemented in the washing machine 100. In some embodiments, the learning processor 130 may be implemented by using the memory 160.

Optionally or additionally, the learning processor 130 may be implemented by using a memory related to the washing machine 100, for example, an external memory coupled directly to the washing machine 100 or a memory maintained in a server communicating with the washing machine 100.

In another embodiment, the learning processor 130 may be implemented by using a memory maintained in a cloud computing environment or by using another remote memory location accessible by the washing machine 100 through a communication method such as a network.

The learning processor 130 may be generally configured such that data is stored in one or more databases in order that the data is identified, indexed, categorized, manipulated, stored, retrieved and output for the purpose that data is used in supervised learning, unsupervised learning, reinforcement learning, data mining, predictive analytics or in other electronic devices.

Through use of any of a variety of different types of data analysis algorithms and machine learning algorithms, the information stored by the learning processor 130 may be used by one or more other controllers of the washing machine 100 or the processor 180.

Examples of such algorithms include k-nearest neighbor system, fuzzy logic (e.g., probability theory), neural network, Boltzmann machine, vector quantization, pulse neural network, support vector machine, maximum margin classifier, hill climbing, inductive logic system Bayesian network, Petri Net (e.g., finite state machine, Mealy machine, Moore finite state machine), classifier tree (e.g., perceptron tree, support vector tree, Markov tree, decision tree forest, random forest), stake model and system, artificial fusion, sensor fusion, image fusion, reinforcement learning, augmented reality, pattern recognition, automated planning, and the like.

The learning processor 130 may store an artificial neural network (ANN) model used in the machine learning algorithm in the memory 160, generate the learning model obtained by training the artificial neural network model and store the learning model in the memory 160. In addition, the learning processor 140 may perform tasks such as classification, detection, and recognition based on data input by using the learning model.

Artificial intelligence refers to the field of studying artificial intelligence or methodology for making artificial intelligence, and the machine learning refers to the field of defining various issues dealt with in the field of artificial intelligence and studying methodology for solving the various issues. The machine learning is defined as an algorithm that enhances the performance of a certain task through steady experience with the certain task.

The artificial neural network is a model used in machine learning and may mean a whole model which has a problem-solving ability and is composed of artificial neurons (nodes) that form a network by synaptic connections. The artificial neural network may be defined by a connection pattern between neurons of different layers, a learning process for updating model parameters, and an activation function for generating an output value.

Figure 5:
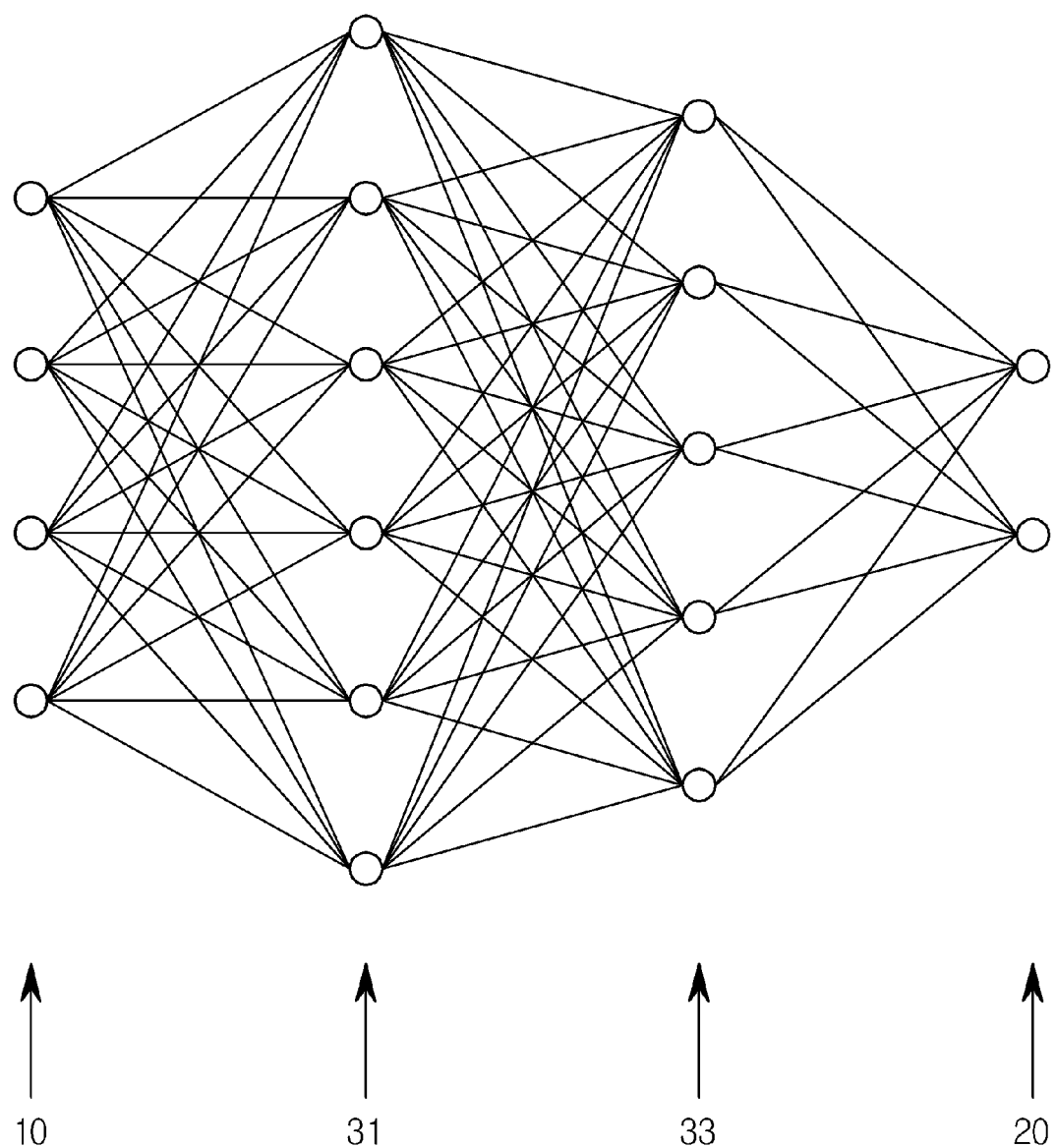
FIG. 5 is a view showing an example of a fully connected artificial neural network structure.

FIG. 5 is a view showing an example of a fully connected artificial neural network structure.

Referring to FIG. 5, the artificial neural network may include an input layer 10, an output layer 20, and optionally one or more hidden layers 31 and 32. Each layer includes one or more neurons which correspond to the neurons in the neural network, and the artificial neural network may include a synapse that links a node in one layer with a node in another layer. In the artificial neural network, a node may receive input signals input through the synapse, and generate an output value based on an activity function of a weight and a bias for each input signal. The output value of each node may act as an input signal to the next layer through the synapse. An artificial neural network in which all the nodes of one layer and all the nodes of the next layer are connected through the synapses may be referred to as a fully connected artificial neural network.

Parameters of the artificial neural network model may mean parameters determined by learning, and may include the weight of the synaptic connections and bias of neurons, etc. In addition, a hyper parameter may mean a parameter to be set before learning in the machine learning algorithm, and may include a learning rate, the number of times of the repetition, a mini batch size, an initialization function, and the like.

Machine learning, which is implemented by a deep neural network (DNN) including a plurality of hidden layers among artificial neural networks, is called deep learning, and the deep learning is part of the machine learning. Hereinafter, the machine learning may be used as meaning the deep running.

Figure 6:
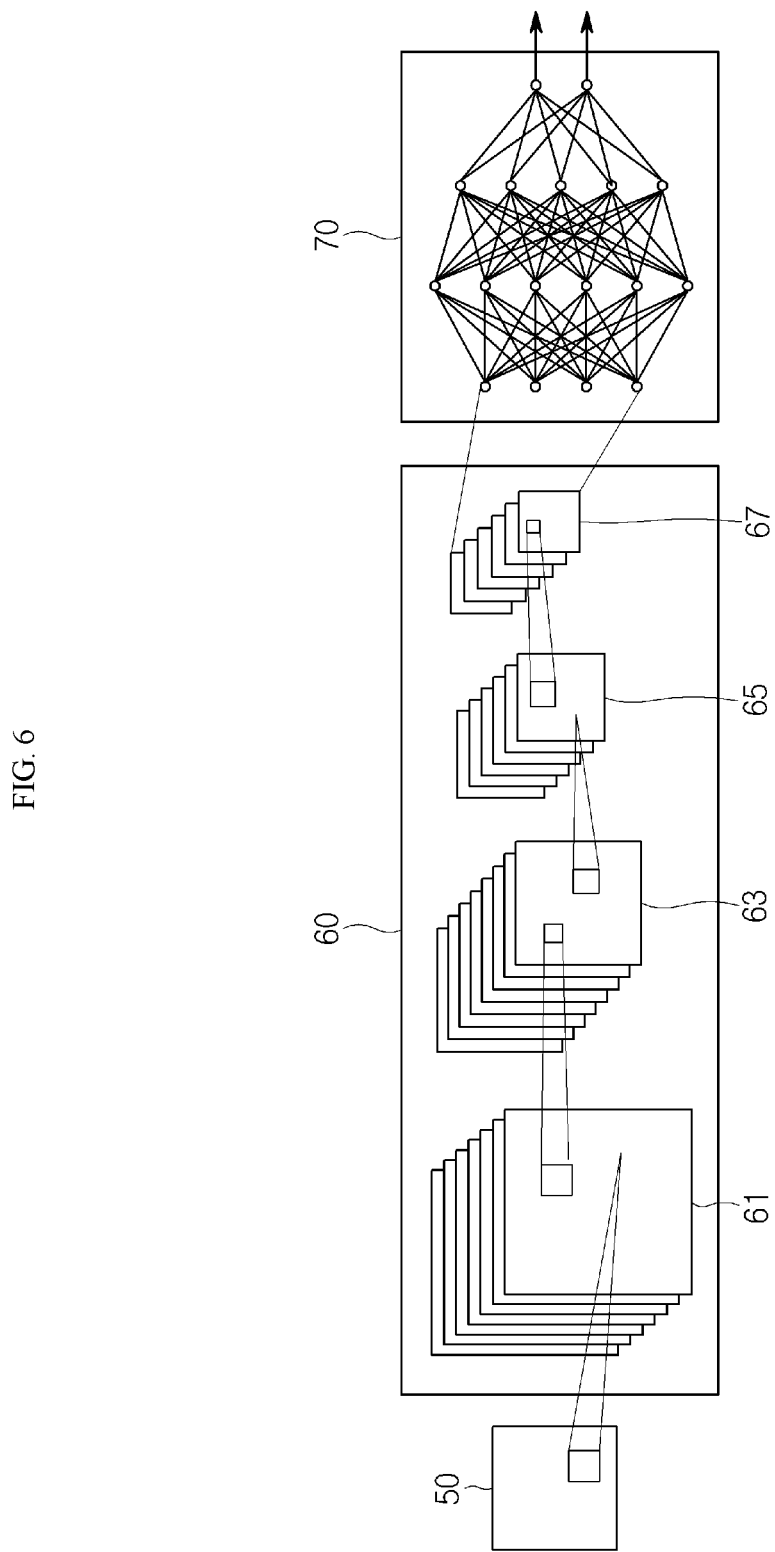
FIG. 6 is a view showing an example of a structure of a convolutional neural network (CNN), that is, a kind of a deep neural network.

FIG. 6 is a view showing an example of a structure of a convolutional neural network (CNN), that is, a kind of a deep neural network.

In the identification of structural spatial data such as images, moving pictures, and character strings, a convolutional neural network structure as shown in FIG. 6 may be more effective. The convolutional neural network can effectively recognize features associated with adjacent images while maintaining spatial information of the image.

Referring to FIG. 6, the convolutional neural network may include a feature extraction layer 60 and a classification layer 70. The feature extraction layer 60 may synthesize those located spatially close in the image by using convolution and then extract the features of the image.

The feature extraction layer 60 may be configured by stacking a plurality of convolution layers 61 and 65 and a plurality of pooling layers 63 and 67. By the convolution layers 61 and 65, the activation function may be applied after a filter is applied to input data. The convolution layers 61 and 65 may include a plurality of channels. By each of the channels, different filters and/or different activation functions may be applied. The result of the convolution layers 61 and 65 may be a feature map. The feature map may be data in the form of a two-dimensional matrix. The pooling layers 63 and 67 may receive output data of the convolution layers 61 and 65, that is, the feature map, as an input, and may be used to reduce the size of the output data or to emphasize specific data. The pooling layers 63 and 67 may generate output data by applying a max pooling function which selects the maximum value among some data of the output data of the convolution layers 61 and 65, an average pooling function which selects an average value, and a min pooling function which selects the minimum value.

The feature map which is generated through a series of the convolution layers and the pooling layers may become gradually smaller in size. A final feature map generated through the last convolution layer and the last pooling layer may be converted to have a one-dimensional form and be input to the classification layer 70. The classification layer 70 may have the fully connected artificial neural network structure shown in FIG. 2. The number of input nodes in the classification layer 70 may be equal to a number obtained by multiplying the number of elements of a matrix of the final feature map by the number of channels.

In addition to the above-described convolutional neural network, a recurrent neural network (RNN), a long short-term memory (LSTM) network, and gated recurrent units (GRU) may be also used as the deep neural network structure. The recurrent neural network can classify or predict by learning sequential data. The recurrent neural network has a recurrent structure therein, so that the learning of the past time is multiplied by a weight and is reflected in the current learning. Thus, the current output result is affected by the output result from the past time, and the hidden layer performs a kind of memory function. The recurrent neural network may be used to analyze a voice waveform and to perform a machine translation, may be used to identify front and back components of a text sentence, and to generate a text, or may be used to recognize voices.

The purpose of artificial neural network learning is regarded as determining a model parameter that minimizes a loss function. The loss function may be used as an index for determining an optimal model parameter in the learning process of the artificial neural network. In the case of a fully connected artificial neural network, the weight of each synapse may be determined by learning. In the case of the convolutional neural network, a filter of the convolution layer for extracting the feature map may be determined by learning.

The machine learning may be classified into supervised learning, unsupervised learning, and reinforcement learning based on a learning method.

The supervised learning refers to a method of training the artificial neural network in a state in which a label for learning data is given. The label may mean a correct answer (or a result value) that the artificial neural network must infer when the learning data is input to the artificial neural network. The unsupervised learning may refer to a method of training the artificial neural network in a state in which a label for learning data is given. The reinforcement learning may refer to a learning method of training an agent defined in a certain environment to select a behavior or a behavior sequence that maximizes the cumulative reward in each state.

The learning processor 130 may train models 161a and 161b composed of artificial neural networks by using the learning data. According to the embodiment, the learning processor 130 may train the models 161a and 161b composed of a plurality of artificial neural networks. In this case, the learning data for each model may vary depending on the purpose of each model. Here, the trained artificial neural network may be referred to as a learning model. The learning model may be implemented in hardware, software, or by a combination of hardware and software. The learning model may be used to infer a result value for a new input data instead of the learning data and may be used as a basis for determination to perform a certain operation. According to the embodiment, the learning processor 130 may perform the artificial intelligence processing together with the learning processor 240 of the server 200.

The learning processor 130 may be integrated with the processor 180 of the washing machine 100. In addition, the learning model which is executed in the learning processor 130 may be implemented in hardware, software, or by a combination of hardware and software. When the learning model is partially or wholly implemented in software, one or more instructions constituting the learning model may be stored in the memory 160, an external memory coupled directly to the washing machine 100 or a memory which is maintained in an external device. The learning processor 130 may realize an AI processing program by reading the instruction from the memory and executing the instruction.

According to various embodiments, the sensing unit 140 may obtain at least one of information on the inside of the washing machine 100, information on ambient environment of the washing machine 100, and user information by using various sensors. According to the embodiment, the sensing unit 140 is a water quantity sensor for measuring a water quantity in the washing machine 100, a water supply sensor for measuring a water supply quantity, an RPM sensor for measuring the number of rotations of a washing tank or a motor rotating the washing tank, and a sensor for measuring an amount of laundry.

According to various embodiments, the memory 160 may store data supporting various functions of the washing machine 100. For example, the memory 160 may store washing process information preset in the washing machine 100, learning data collected through the user input received through the communication unit 110 and/or the input unit 120, instructions for the learning processor 130, instructions for the processor 180, a model (an artificial neural network) which is being trained or has been trained through the learning processor 130, and a learning history, etc.

The memory 160 may include a magnetic storage media or a flash storage media. However, the scope of the present invention is not limited to this. The memory 160 may include an internal memory and/or an external memory and may include a volatile memory such as DRAM, SRAM, or SDRAM, a non-volatile memory such as one time programmable ROM (OTPROM), PROM, EPROM, EEPROM, mask ROM, flash ROM, NAND flash memory, or NOR flash memory, a flash drive such as SSDs, compact flash (CF) cards, SD cards, Micro-SD cards, Mini-SD cards, Xd cards, or memory sticks, or a storage device such as an HDD.

According to various embodiments, the driving unit 170 may perform the washing process for laundry by rotating a drum or a washing tank of the washing machine 100. Based on the control command of the processor 180 according to the ongoing washing process, the driving unit 170 may perform all the mechanical operations required for washing, for example, the opening and closing of a water supply port, the opening and closing of a drain port, and the rotation of the drum or the washing tank for washing and spin-drying.

According to various embodiments, the processor 180 may determine at least one executable operation of the washing machine 100 based on information that is determined or generated by using a data analysis algorithm or a machine learning algorithm. In addition, the processor 180 may control the components of the washing machine 100 and perform the determined operation. A program used by the processor 180 performing the operation may be stored in the memory 160.

The processor 180 may request, search, receive or utilize the data of the learning processor 130 or the memory 160 and may control the components of the washing machine 100 such that operations which are predicted or are determined to be desirable among the at least one executable operation are performed.

When the processor 180 needs to be associated with an external device in order to perform the determined operation, the processor 180 may generate a control signal for controlling the corresponding external device and transmit the generated control signal to the corresponding external device.

The processor 180 may obtain information on the intent of the user input and determine user's requirements based on the obtained intent information.

The processor 180 may collect history information including operation contents of the washing machine 100 or a user's feedback on the operation, and the like, and store the history information in the memory 160 or in the learning processor 130, or transmit the history information to the external device such as the server 200, etc. The collected history information may be used to update the learning model.

The processor 180 may control at least some of the components of the washing machine 100 in order to execute an application program stored in the memory 160. In addition, the processor 180 may operate two or more of the components included in the washing machine 100 in combination with each other in order to execute the application program.

Figure 7:
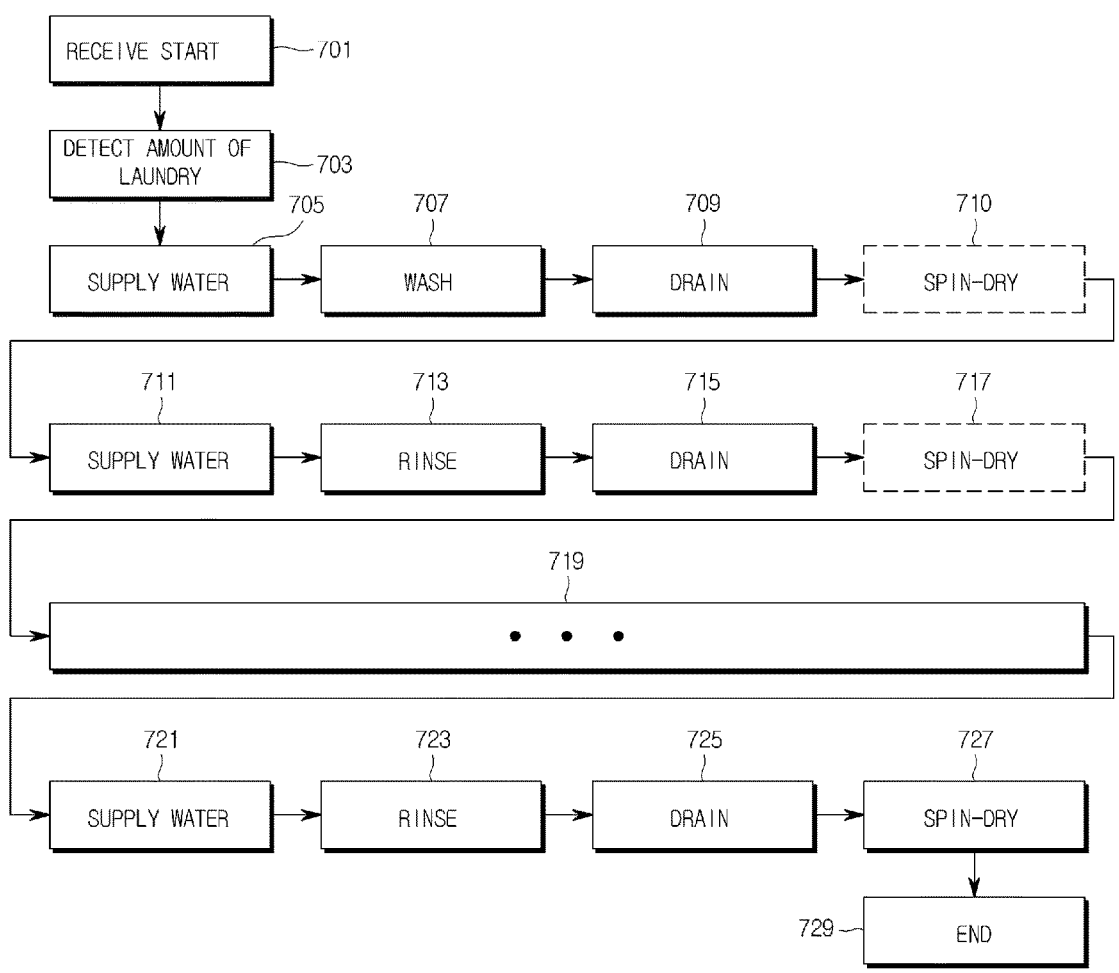
FIG. 7 is a view showing washing operations of the washing machine according to the embodiments.

FIG. 7 is a view showing washing operations of the washing machine 100 according to the embodiments.

Referring to FIG. 7, in operation 701, when the washing machine 100 receives a washing start command after the user sets the washing, the washing machine 100 may detect the amount of laundry input into the washing tank in operation 703, and start the washing process. According to the embodiment, since it is common to put laundry before the user sets the washing, the washing machine 100 may first detect the amount of laundry in operation 703 and then may receive the washing start command in operation 701.

In operation 705, the washing machine 100 may perform predetermined amount of water supply based on the detected amount of laundry, perform the washing of the laundry in operation 707, and perform drainage in operation 709. Then, the washing machine 100 may additionally perform the spin-drying in operation 710.

The washing machine 100 may perform the predetermined amount of water supply in operation 711, perform the rinsing in operation 713, and may perform the drainage in operation 715. According to the embodiment, the washing machine 100 may additionally perform the spin-drying in operation 717.

The washing machine 100 may, in operation 719, repeatedly perform the operations for rinsing from operation 711 to operation 717 based on the user input. According to the embodiment, when the rinsing is set to twice based on the user input, the washing machine may proceed directly to operation 721 from operation 717 without performing the operation according to operation 719. According to another embodiment, when the number of rinsing is set to three times based on the user input, the washing machine may perform the operation according to operation 719 once in order to cause the rinsing of the washing machine to be performed three times in total.

The washing machine 100 may perform the predetermined amount of water supply in operation 721 for the last rinsing. According to the embodiment, the washing machine 100 may perform input a fabric softener before performing the operation of operation 721. The washing machine 100 may perform the last rinsing in operation 723, perform the drainage in operation 725, perform the spin-drying in operation 727, and end washing in operation 729. The washing machine 100 may notify the user of the end of the washing through the output unit 150 or the communication unit 110 when the washing is ended.

Figure 8:
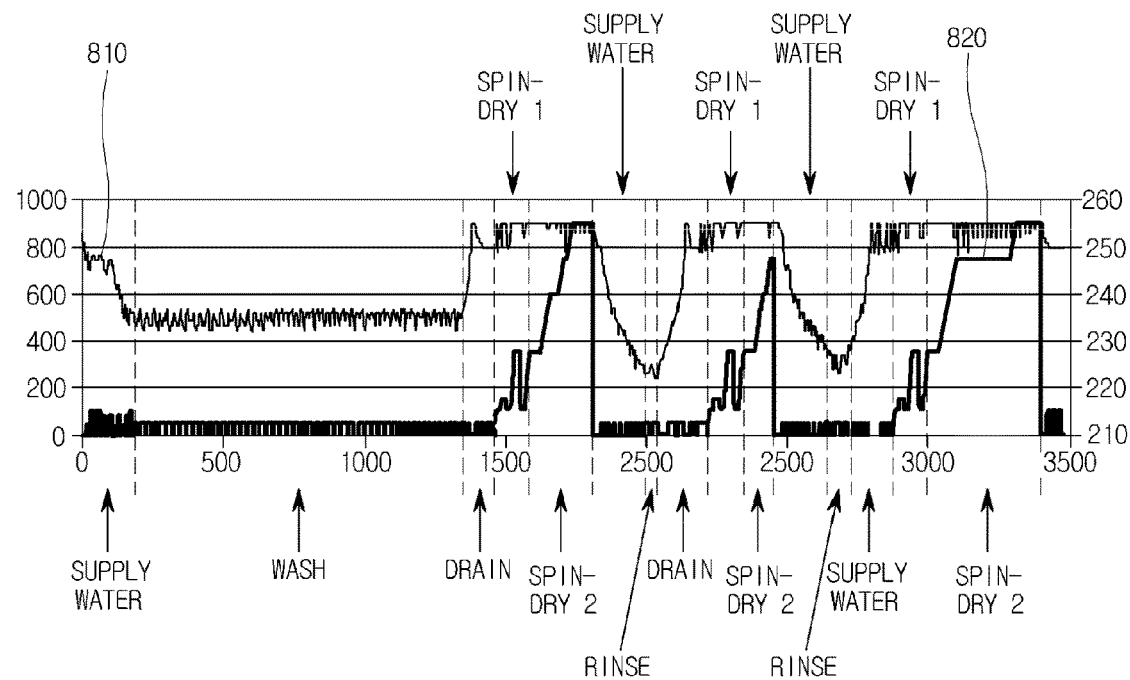
FIG. 8 is a view showing measurement results by a water supply sensor and an RPM sensor during a washing process of the washing machine according to the embodiment.

FIG. 8 is a view showing measurement results by the water supply sensor and the RPM sensor during the washing process of the washing machine 100 according to the embodiment.

drying is performed in operation 710, the frequency 810 output by the water supply sensor may be the highest value indicating that the water quantity is almost zero. During the water supply of operation 705, the washing of operation 707, and the drainage of operation 709, the output 820 of the RPM sensor shows a very low number of rotations, while the output 820 of the RPM sensor during the spin-drying of operation 710 is as shown in FIG. 8, may be significantly high.

According to various embodiments, the spin-drying may include two spin-drying operations. A first spin-drying operation (spin-drying 1) is for evenly spreading the laundry in the washing tank or in the drum, and the drum or the washing tank may be rotated while changing the rotation direction. The laundry is spread evenly and is balanced by the first spin-drying operation (spin-drying 1), which does not cause collision with the outer tank. A second spin-drying operation (spin-drying 2) is performed so that the drum or the washing tank can be rotated very quickly.

Then, the washing machine 100 may repeatedly perform the water supply, drainage, and spin-drying for the rinsing operation. Accordingly, the frequency 810 output by the water supply sensor may be changed.

Table 1 shows a typical time taken to perform each operation of the washing process of the washing machine 100 in accordance with the embodiment.

TABLE 1

| Washing Process | | Washing | | | | Rinsing | | | | Spin-Drying | | Displayed Time |
|---|---|---|---|---|---|---|---|---|---|---|---|---|
| | | Water Supply | Washing | Drainage | Spin-Drying 1 | Spin-Drying 2 | Water Supply | Rinsing | Drainage | Spin-Drying 1 | Spin-Drying 2 | |
| Detected amount of laundry | 1 LV | 3 | 8 | 1 | 1 | 2 | 2 | 1 | 1 | 4 | 3 | 33 |
| | 2 LV | 4 | 8 | 1 | 1 | 2 | 2 | 1 | 1 | 6 | 3 | 36 |
| | 3 LV | 4 | 8 | 1 | 1 | 2 | 2 | 1 | 1 | 6 | 3 | 36 |
| | 4 LV | 4 | 15 | 1 | 3 | 2 | 2 | 1 | 1 | 10 | 3 | 51 |
| | 5 LV | 5 | 17 | 1 | 6 | 2 | 3 | 2 | 1 | 8 | 8 | 67 |
| | 6 LV | 5 | 17 | 1 | 6 | 2 | 3 | 2 | 1 | 8 | 8 | 67 |
| | 7 LV | 5 | 17 | 1 | 6 | 2 | 3 | 2 | 1 | 8 | 8 | 67 |

Referring to FIG. 8, a frequency 810 output by the water supply sensor may provide information on the water quantity in the washing tank. According to the embodiment, the water supply sensor may output a lower frequency as pressure increases based on the pressure according to the water quantity. Accordingly, a low frequency may indicate a large amount of water in the washing tank, and a high frequency may indicate a small amount of water in the washing tank. In addition, an output 820 of the RPM sensor may indicate a rotational speed of the drum or the washing tank.

The washing machine 100 may start water supply according to operation 705 based on washing start reception in operation 701 and the detection of the amount of laundry in operation 703. When the water supply starts, the frequency 810 output by the water supply sensor gradually decreases as shown in FIG. 8, and when the frequency reaches a frequency which indicates a predetermined water quantity, the water supply stops and washing can be performed according to operation 707. Since the water quantity is maintained constant during the washing, the frequency 810 output by the water supply sensor can maintain a constant range. When the washing is completed and the draining is performed according to the operation 709, the frequency 810 output by the water supply sensor is increased, and when the spin- As shown in Table 1, the processor of the washing machine 100 may determine an estimated time based on a predetermined value based on the detected amount of laundry and the user's washing setting and may display the estimated time to the user. For example, the processor 180 may display the estimated time on the control panel 123 of the output unit 150.

However, in Table 1, a water supply time, drainage time, and spin-drying 1 time can be varied according to the ambient conditions of the washing machine operation. For example, when water pressure of a house where the washing machine is installed is low, the water supply time may be longer. Alternatively, if a filter of the drain port of the washing machine is clogged by foreign substances, etc., the draining time may be longer. Alternatively, there is a possibility that the time required for the spin-drying 1 may be longer if the washing machine is installed without proper balance.

As such, in many parts of the washing process, the operation time may be different from a predetermined value. Therefore, when the estimated washing time is determined based on a time set in advance in the washing machine at the time when the washing machine is released, am actual operation time and the estimated time of the washing machine may be different, which may cause inconvenience to the user.

Figure 9:
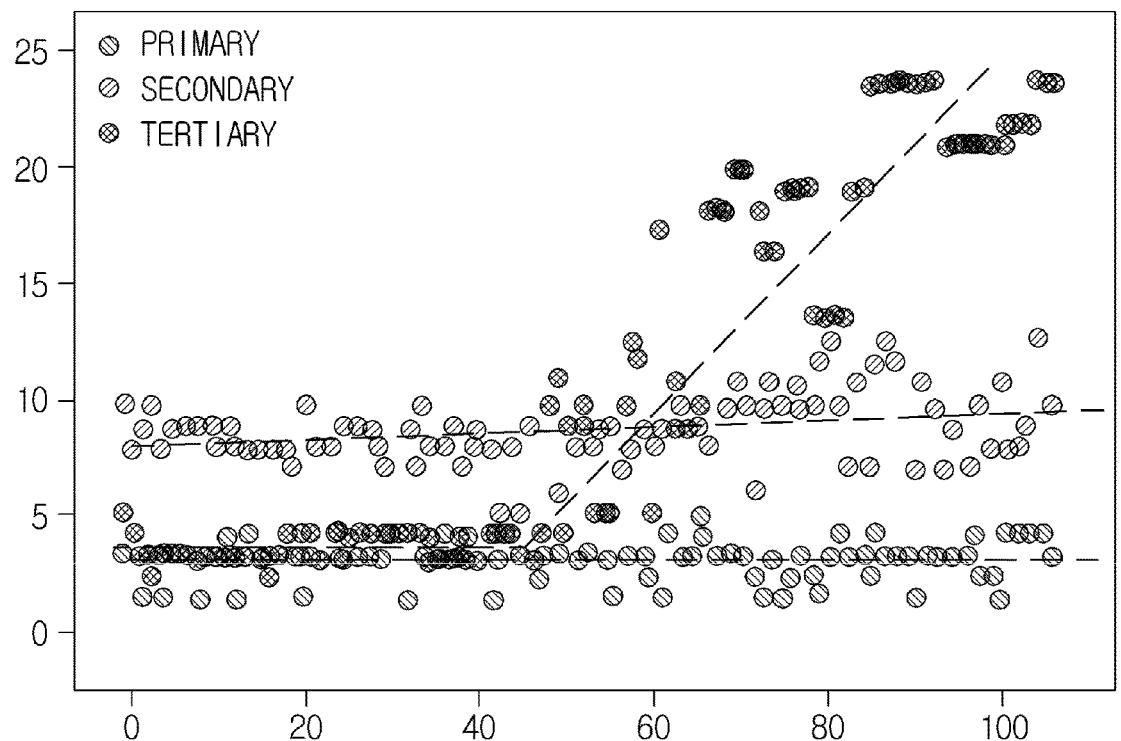
FIG. 9 is a view showing data collected by measuring a water supply time for each washing.

FIG. 9 is a view showing data collected by measuring the water supply time for each washing.

Referring to FIG. 9, the x-axis represents the x-th washing process, and the y-axis represents a time taken for the water supply in each washing process. In FIG. 9, primary, secondary, and tertiary data may be collected at different times. According to the embodiment, the primary data may be collected first after initial installation.

Referring to FIG. 9, the primary data indicates that the water supply time is on average about 4 minutes, which may be similar to or the same as the water supply time set in advance in the washing machine 100. The secondary data indicates that the water supply time is on average about 9 minutes, which may be different from the water supply time set in advance in the washing machine 100. If the water supply time set in advance in the washing machine 100 is 4 minutes and an actual water supply time is 9 minutes, the water supply time may be 15 minute longer than the time that the washing machine has estimated, in one washing process in which the water supply is set to be performed three times. Therefore, it is necessary to change the estimated time. According to the embodiment, if the secondary data is obtained after the washing machine is installed for the first time, it is determined that the current water pressure of the house where the washing machine has been installed is low, and the water supply time set in advance in the washing machine 100 can be changed from 4 minutes to 9 minutes. Then, the estimated time of the washing machine 100 may match the actual operation time.

According to another embodiment, when, after the washing machine is installed for the first time, the primary data is obtained and the secondary data is obtained with the lapse of a certain period of time, the washing machine 100 may determine a water supply unit as being in an abnormal condition rather than determine the water pressure of the house as having been decreased. For example, the washing machine 100 may determine foreign substances as having been caught in the water supply port, may determine a faucet as having been partially turned off, or may determine the water supply control of the washing machine as malfunctioning. Based on this determination, the washing machine 100 may display a related notification to the user. For example, the washing machine 100 may display a notification requesting the user to check whether foreign substances are caught in the water supply port or a faucet is partially turned off. When the same phenomenon continues to occur even after the washing machine 100 transmits the request notification to the user, the washing machine 100 may display a notification to the user that the washing machine 100 needs to be repaired.

The tertiary data shows that the water supply time matches to some degree the water supply time set in advance for a first certain period of time and that the water supply time gradually increases at a certain moment. In this case, foreign substances may be caught in the water supply port or the filter may be clogged. Accordingly, the washing machine 100 may display a filter cleaning request notification to the user. If such a situation continues even afterwards, the washing machine 100 may display a notification that the user needs to repair.

As described above, the washing machine 100 can adjust the estimated time in accordance with the operating environment of the washing machine as well as the abnormal condition of the washing machine by using data collected through a certain number of washing processes.

Figure 10:
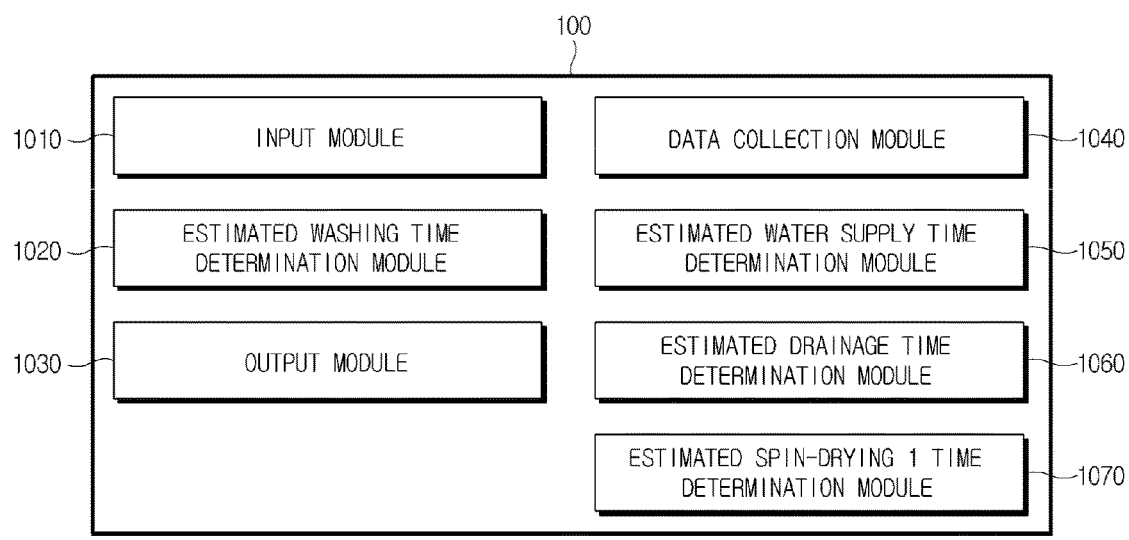
FIG. 10 is a block diagram showing functions performed by a processor 180 and/or a learning processor 130 of a washing machine 100 in accordance with various embodiments of the present disclosure.

FIG. 10 is a block diagram showing functions performed by the processor 180 and/or the learning processor 130 of the washing machine 100 in accordance with various embodiments of the present disclosure. The block diagram of FIG. 10 is an example of briefly showing software components required for the washing machine 100 to derive the estimated time of the washing process. According to the embodiment, some components in the block diagram of FIG. 10 may be omitted. According to another embodiment, other unshown components may be further added. In addition, several components may be integrated with each other, or one component may be divided into a plurality of components. Each component shown in FIG. 10 may be implemented by a separate program, or some components may be closely related to each other and implemented by a single program.

Referring to FIG. 10, the processor 180 and/or the learning processor 130 of the washing machine 100 include an input module 1010, an estimated washing time determination module 1020, an output module 1030, a data collection module 1040, an estimated water supply time determination module 1050, an estimated drainage time determination module 1060, and an estimated spin-drying 1 time determination module 1070.

According to various embodiments, the input module 1010 may receive a user's setting command or operation command in association with the input unit 120 or the communication unit 110 of the washing machine 100. In one embodiment, the user may input settings for laundry washing to the washing machine 100 (e.g., individual setting such as three times of rinsing, strong spin-drying, or integrated setting such as daily course, sanitary course) by using the control panel 123 or the user terminal 300. The processor 180 may obtain settings of the corresponding user through the input module 1010. For example, when the user selects and inputs the daily course, "standard washing," "rinsing twice," "strong spin-drying," "water temperature cold water" may be set based on the input by the input module 1010 of the processor 180. A washing process setting corresponding to each course may be stored in the memory 160.

In addition, through the input module 1010, the processor 180 may also obtain the amount of laundry sensed through the sensor of the sensing unit 140.

According to various embodiments, the estimated washing time determination module 1020 of the processor 180 may determine, as shown in Table 1, the estimated washing time based on the detected amount of laundry and the washing process set by the user. For example, if the user selects the daily course and the detected amount of laundry has a level 4 (LV), in response to this, the estimated washing time determination module 1020 of the processor 180 recognizes the washing is performed in the order of water supply (4 minutes)→washing (15 minutes)→drainage (1 minute)→spin-drying 1 (3 minutes)→spin-drying 2 (2 minutes)→water supply (2 minutes)→rinsing (1 minute)→drainage (1 minute)→spin-drying 1 (3 minutes)→spin-drying 2 (2 minutes)→water supply (2 minutes)→rinsing (1 minute)→drainage (1 minute)→spin-drying 1 (10 minutes)→spin-drying 2 (3 minutes). The estimated washing time determination module 1020 may determine the total estimated time as 51 minutes accordingly. Here, the "standard washing" execution time, the "rinsing" execution time, and the "spin-drying 2" execution time may be stored as fixed values in the memory 160 in advance. According to the embodiment, if the user sets "strong washing" instead of the "standard washing", the washing time may be changed in correspondence to this.

However, the "strong washing" execution time may be stored as a fixed value in the memory 160 in advance.

Meanwhile, the water supply time, the drainage time, the spin-drying 1 time may be changed according to the use environment of the washing machine 100. The estimated washing time determination module 1020 may use values obtained from the estimated water supply time determination module 1050, the estimated drainage time determination module 1060, and the estimated spin-drying 1 time determination module 1070 for the water supply time, the drainage time, and the spin-drying 1 time, respectively.

The estimated washing time determination module 1020 of the processor 180 may change the estimated washing time based on the remaining operation of the washing process as the washing progresses. According to the embodiment, the estimated washing time determination module 1020 may include an internal timer and may modify the remaining estimated washing time while reducing the estimated washing time set initially, based on the timer. According to another embodiment, the estimated washing time determination module 1020 may modify the estimated washing time by subtracting the corresponding execution time every time each operation set for performing the washing process is completed. Here, the execution time to be subtracted may not be an actual execution time but may be a value stored in the memory 160. Also, the execution time to be subtracted may be a value obtained from the estimated water supply time determination module 1050, the estimated drainage time determination module 1060, and the estimated spin-drying 1 time determination module 1070.

According to various embodiments, the output module 1030 in conjunction with the output unit 150 and/or the communication unit 110 may inform the user of the estimated washing time determined by the estimated washing time determination module 1020 and the estimated washing time which is modified as the washing progresses.

When the output module 1030 receives the user input through the input module 1010, the output module 1030, through the output unit 150 and/or the communication unit 110, may output information indicating that the input has been received. For example, when it is recognized through the input module 1010 that the user presses a power button of the control panel 123, the output module 1030 may display power-ON on the control panel 123 or may output a voice message of "power is on" through a speaker of the output unit 150. Alternatively, the output module 1030 may transmit a notification indicating that power is applied to the user terminal 300, the server 200, or an AI speaker through the communication unit 110. In this case, the AI speaker may output a voice message of "power is on". When the input module 1010 receives a course selection input of the user or an individual selection input of the user through the input unit 120 and/or the communication unit 110, the output module 1030 may display an indication corresponding to the selection visually through the control panel 123 of the output unit 150 or acoustically through the speaker of the output unit 150, or may transmit, to the user terminal 300 or the server 200 through the communication unit 110, a notification that the selection has been performed.

According to another embodiment, the output module 1030 may transmit the state of the washing machine 100 to the user terminal through the communication unit 110 or inform the user of the state of the washing machine 100 through the output unit 150. For example, when the output module 1030 determines the washing machine 100 as being in an abnormal condition or when it is necessary to change the estimated water supply time, the estimated drainage time, and the estimated spin-drying 1 time determined by the estimated water supply time determination module 1050, the estimated drainage time determination module 1060, and the estimated spin-drying 1 time determination module 1070, the output module 1030 may transmit a message for providing the information to the user terminal 300 or the server 200, or may inform the user in the form of a voice message either through the AI speaker connected through the communication unit 110 or through the speaker of the unit 150 or may inform the user in the form of a visual message through an LED.

According to various embodiments, the data collection module 1040 may collect the drainage time, the water supply time, and the spin-drying 1 time that may be changed according to the environment during a time when the washing machine 100 performs the washing process.

For example, the washing machine 100 may perform three times of water supply, three times of drainage, and three times of spin-drying 1 while performing the washing process according to the above-mentioned "daily course". The data collection module 1040 may collect the time taken to perform each of the water supply, the drainage, and the spin-drying 1 and store it in the memory 160. According to the embodiment, the data collection module 1040 stores each of the three execution times collected for the water supply, each of the three execution times collected for the drainage, or each of the three execution times collected for the spin-drying 1. The data collection module will have almost the same water supply time for a plurality of water supplies included in one washing process, will have almost the same drainage time for a plurality of drainages or will have almost the same spin-drying 1 time for a plurality of spin-dryings 1. Therefore, according to another exemplary embodiment, the data collection module 1040 may perform a statistical process (e.g., mean, median) on the three execution times collected for the water supply and store them as one value, may perform a statistical process on the three execution times collected for the drainage and store them as one value, or may perform a statistical process on the three execution times collected for the spin-drying 1 and store them as one value. Here, the data collection module 1040 may store the detected amount of laundry together.

According to various embodiments, the estimated water supply time determination module 1050 may determine the estimated water supply time of the washing machine 100. The estimated water supply time determination module 1050 may determine the estimated water supply time of the washing machine 100 according to the amount of laundry by using water supply time data obtained from the data collection module 1040.

According to the embodiment, the estimated water supply time determination module 1050 may determine the latest water supply time obtained for each laundry amount level by the data collection module 1040 as the estimated water supply time.

According to another embodiment, the estimated water supply time determination module 1050 may determine a value obtained by averaging N pieces of previous water supply time obtained for each laundry amount level by the data collection module 1040 as the estimated water supply time for each laundry amount level.

According to another embodiment, the estimated water supply time determination module 1050 may determine the estimated water supply time for each laundry amount level based on the trained artificial neural network model. According to the embodiment, the trained artificial neural network model may receive the laundry amount level as an input and may output the estimated water supply time. Whenever the artificial neural network model is updated through additional learning, the estimated water supply time determination module 1050 may obtain the estimated water supply time for each laundry amount level by using the updated learning model and store it in the memory 160. In addition, when there is a request from the estimated washing time determination module 1020, the estimated water supply time determination module 1050 may read the determined estimated water supply time from the memory 160 and may transmit to the estimated washing time determination module 1020. According to another embodiment, the estimated water supply time determination module 1050 may provide the estimated washing time determination module 1020 with the estimated water supply time of the trained artificial neural network model that is output by inputting the laundry amount level received from the estimated washing time determination module 1020 to the trained artificial neural network model. In this case, a processing power to drive the trained artificial neural network model must be used every time. Therefore, this may not be efficient in terms of power consumption.

According to the embodiment, the artificial neural network model trained to determine the estimated water supply time may improve the learning model by using learning data having a matrix form shown in FIG. 11. In the example of FIG. 11, the first column 1110 may indicate the sensed amount of laundry, and the second to eleventh columns 1120 may indicate the actually measured water supply time. According to the embodiment, the second to eleventh columns each have a value of 0 or 1, and if the value of a corresponding column is 1, this may indicate that the water supply time is 1, 2, 3, 4, 5, 6, 7, 8, 9, and 10 minutes or longer. Each row represents the number of washing processes performed by the washing machine 100. That is, the first row represents the actually measured amount of laundry and water supply time in the first washing process, and the second row represents the actually measured amount of laundry and water supply time in the second washing process. Here, the expression of the first or the second just expresses the first or the second in the learning data.

According to various embodiments, the estimated water supply time determination module 1050 may determine how many times washing process execution data are collected to generate the learning data shown in FIG. 11 in order to train the artificial neural network model. For example, the estimated water supply time determination module 1050 may generate the learning data based on N (e.g., 100) number of newly collected water supply time data. In other words, the learning data may be generated by using N number of water supply time data collected after N number of water supply time data previously used for the purpose of updating the artificial neural network model. According to another embodiment, the estimated water supply time determination module 1050 may generate the learning data by using m (e.g., 50) number of recently collected water supply time data and L (e.g., 50) number of water supply time data newly collected among the data previously used for the purpose of updating the artificial neural network model.

According to the embodiment, the estimated water supply time determination module 1050 inputs sequentially the learning data as shown in FIG. 11 into the artificial neural network model, so that learning is performed and the artificial neural network model is updated, and the trained artificial neural network model can be more sophisticated.

According to various embodiments, the estimated water supply time determination module 1050 can additionally recognize an abnormal condition related to water supply such as low water pressure or filter clogging, etc. According to the embodiment, the estimated water supply time determination module 1050 may determine that the water pressure which is applied to the water supply is in an abnormal condition if the estimated water supply time determined by the trained artificial neural network model or by another method differs by more than a predetermined value or by more than a predetermined ratio from a previously estimated water supply time. For example, as shown in FIG. 9, when a difference between the respective pieces of water supply time in each water supply time data set is not large however an average value between a primary data set and a secondary data set or a value obtained by the trained artificial neural network model differs by more than a predetermined value, the water pressure may be recognized by the estimated water supply time determination module 1050 as having reduced. Alternatively, when the estimated water supply time is changed from a value by the secondary data to a value by the primary data, the water pressure may be recognized by the estimated water supply time determination module 1050 as having increased.

When the estimated water supply time determination module 1050 predicts the low water pressure, the estimated water supply time determination module 1050 may cause the output module 1030 to provide a low water pressure notification to the user. For example, by the request of the estimated water supply time determination module 1050, the output module 1030 may transmit a message informing the user that the water supply is in a low water pressure state. In addition, the output module 1030 may also transmit a message informing that the user should check whether the faucet is turned off or foreign substances are caught in the filter. In addition, when the estimated water supply time increases greater than a predetermined period of time (for example, 10 minutes), the water supply system is recognized by the estimated water supply time determination module 1050 as being in an abnormal condition, and then the estimated water supply time determination module 1050 may transmit, to the user through the output module 1030, a message suggesting making a repair request to a service center. In this case, the use of the washing machine 100 may be stopped according to the embodiment.

Also, when the determined estimated water supply time is changed differently from the previously estimated water supply time, the estimated water supply time determination module 1050 may immediately apply the changed estimated water supply time. Also, the estimated water supply time determination module 1050 may notify the user through output module 1030 that the estimated water supply time is changed differently from before, and may apply the changed estimated water supply time after being approved to apply the changed estimated water supply time.

According to the embodiment, if the estimated water supply time determination module 1050 recognizes that the water supply time increases as time passes in the water supply time data set collected in order to determine the estimated water supply time again, the filter of the water supply port may be recognized by the estimated water supply time determination module 1050 as being gradually clogged. In this case, the estimated water supply time determination module 1050 may transmit a message requesting cleaning of the water supply port to the user through the output module 1030.

When the estimated water supply time determination module 1050 uses the trained artificial neural network model, it is possible to output information on the abnormal condition together with the estimated water supply time. Alternatively, the estimated water supply time determination module 1050 may include a separate trained artificial neural network model for determining the abnormal condition. The trained artificial neural network model for determining the abnormal condition may receive input the sensed amount of laundry and the actually measured water supply time as inputs, and may set "low water pressure state", "filter clogged state", and "service request", etc., as outputs.

According to various embodiments, the estimated drainage time determination module 1060 may determine the estimated drainage time of the washing machine 100. The estimated drainage time determination module 1060 may determine the estimated water supply time of the washing machine 100 according to the amount of laundry by using drainage time data obtained from the data collection module 1040.

According to the embodiment, the estimated drainage time determination module 1060 may determine the latest drainage time obtained for each laundry amount level by the data collection module 1040 as the estimated drainage time.

According to another embodiment, the estimated drainage time determination module 1060 may determine a value obtained by averaging N pieces of previous drainage time obtained for each laundry amount level by the data collection module 1040 as the estimated drainage time for each laundry amount level.

According to another embodiment, the estimated drainage time determination module 1060 may determine the estimated drainage time for each laundry amount level based on the trained artificial neural network model. According to the embodiment, the trained artificial neural network model may receive the laundry amount level as an input and may output the estimated drainage time. Whenever the artificial neural network model is updated through additional learning, the estimated drainage time determination module 1060 may obtain the estimated drainage time for each laundry amount level by using the updated learning model and store it in the memory 160. In addition, when there is a request from the estimated washing time determination module 1020, the estimated drainage time determination module 1060 may read the determined estimated drainage time from the memory 160 and may transmit to the estimated washing time determination module 1020. According to another embodiment, the estimated drainage time determination module 1060 may provide the estimated washing time determination module 1020 with the estimated drainage time of the trained artificial neural network model that is output by inputting the laundry amount level received from the estimated washing time determination module 1020 to the trained artificial neural network model. In this case, a processing power to drive the trained artificial neural network model must be used every time. Therefore, this may not be efficient in terms of power consumption.

According to the embodiment, the artificial neural network model trained to determine the estimated drainage time may improve the learning model by using learning data having a matrix form shown in FIG. 12. In the example of FIG. 12, the first column 1210 may indicate the sensed amount of laundry, and the second to fifth columns 1220 may indicate the actually measured drainage time. According to the embodiment, the second to fifth columns each have a value of 0 or 1, and if the value of a corresponding column is 1, this may indicate that the drainage time is 1, 2, 3, 4, and 5 minutes or longer. Each row represents the number of washing processes performed by the washing machine 100. That is, the first row represents the actually measured amount of laundry and drainage time in the first washing process, and the second row represents the actually measured amount of laundry and drainage time in the second washing process. Here, the expression of the first or the second just expresses the first or the second in the learning data.

According to various embodiments, the estimated drainage time determination module 1060 may determine how many times washing process execution data are collected to generate the learning data shown in FIG. 12 in order to train the artificial neural network model. For example, the estimated drainage time determination module 1060 may generate the learning data based on x (e.g., 50) number of newly collected drainage time data. In other words, the learning data may be generated by using x number of drainage time data collected after x number of drainage time data previously used for the purpose of updating the artificial neural network model. According to another embodiment, the estimated drainage time determination module 1060 may generate the learning data by using y (e.g., 20) number of recently collected drainage time data and z (e.g., 30) number of drainage time data newly collected among the data previously used for the purpose of updating the artificial neural network model. According to the embodiment, the estimated drainage time determination module 1060 inputs sequentially the learning data as shown in FIG. 12 into the artificial neural network model, so that learning is performed and the artificial neural network model is updated, and the trained artificial neural network model can be more sophisticated.

According to various embodiments, the estimated drainage time determination module 1060 can additionally recognize an abnormal condition related to drainage such as low water pressure or filter clogging, etc. According to the embodiment, the estimated drainage time determination module 1060 may determine that a drainage unit is in an abnormal condition if the estimated drainage time determined by the trained artificial neural network model or by another method differs by more than a predetermined value or by more than a predetermined ratio from a previously estimated drainage time. For example, the drain port or the filter of the drain port may be determined by the estimated drainage time determination unit 1060 as having been partially clogged. Similarly to what is shown in FIG. 9, when a difference between respective pieces of drainage time in each drainage time data set is not large however an average value between the primary data set and the secondary data set or a value obtained by the trained artificial neural network model differs by more than a predetermined value, the drain port may be determined by the estimated drainage time determination unit 1060 as having been partially clogged.

When the estimated drainage time determining module 1060 predicts the partial clogging of the drain port, the estimated drainage time determining module 1060 may cause the output module 1030 to provide a notification of the drain port clogging to the user. For example, by the request of the estimated drainage time determination module 1060, the output module 1030 may transmit a message informing the user that the drain port or the filter of the drain port has been partially clogged. In addition, the output module 1030 may also transmit a message informing that the user should check whether the drain port is clogged while presenting a method for checking the clogged drain port state. In addition, when the estimated drainage time increases greater than a predetermined period of time (for example, five minutes), the drainage system is recognized by the estimated drainage time determination module 1060 as having an abnormal condition, and then the estimated drainage time determination module 1060 may transmit, to the user through the output module 1030, a message suggesting making a repair request to a service center. In this case, the use of the washing machine 100 may be stopped according to the embodiment.

Also, when the determined estimated drainage time is changed differently from the previously estimated drainage time, the estimated drainage time determination module 1060 may immediately apply the changed estimated drainage time. Also, the estimated drainage time determination module 1060 may notify the user through output module 1030 that the estimated drainage time is changed differently from before, and may apply the changed estimated drainage time after being approved to apply the changed estimated drainage time.

According to the embodiment, if the estimated drainage time determination module 1060 recognizes that the drainage time increases as time passes in the drainage time data set collected in order to determine the estimated drainage time again, the drain port or the filter of the drain port may be recognized by the estimated drainage time determination module 1060 as being gradually clogged. In this case, the estimated drainage time determination module 1060 may transmit a message requesting cleaning of the drain port to the user through the output module 1030.

When the estimated drainage time determination module 1060 uses the trained artificial neural network model, it is possible to output information on the abnormal condition together with the estimated drainage time. Alternatively, the estimated drainage time determination module 1060 may include a separate trained artificial neural network model for determining the abnormal condition. The trained artificial neural network model for determining the abnormal condition may receive input the sensed amount of laundry and the actually measured drainage time as inputs, and may set "clogged drain port state", "filter clogged state", and "service request", etc., as outputs.

According to various embodiments, the estimated spin-drying 1 time determination module 1070 may determine a first estimated spin-drying time of the washing machine 100. The estimated spin-drying 1 time determination module 1070 may determine the first estimated spin-drying time of the washing machine 100 according to the amount of laundry by using a first spin-drying time data obtained from the data collection module 1040.

According to the embodiment, the estimated spin-drying 1 time determination module 1070 may determine the latest first spin-drying time obtained for each laundry amount level by the data collection module 1040 as the first estimated spin-drying time.

According to another embodiment, the estimated spin-drying 1 time determination module 1070 may determine a value obtained by averaging M pieces of previous drainage time obtained for each laundry amount level by the data collection module 1040 as the first estimated spin-drying time for each laundry amount level.

According to another embodiment, the estimated spin-drying 1 time determination module 1070 may determine the first estimated spin-drying time for each laundry amount level based on the trained artificial neural network model. According to the embodiment, the trained artificial neural network model may receive the laundry amount level as an input and may output the first estimated spin-drying time. Whenever the artificial neural network model is updated through additional learning, the estimated spin-drying 1 time determination module 1070 may obtain the first estimated spin-drying time for each laundry amount level by using the updated learning model and store it in the memory 160. In addition, when there is a request from the estimated washing time determination module 1020, the estimated spin-drying 1 time determination module 1070 may read the determined first estimated spin-drying time from the memory 160 and may transmit to the estimated washing time determination module 1020. According to another embodiment, the estimated spin-drying 1 time determination module 1070 may provide the estimated washing time determination module 1020 with the first estimated spin-drying time of the trained artificial neural network model that is output by inputting the laundry amount level received from the estimated washing time determination module 1020 to the trained artificial neural network model. In this case, a processing power to drive the trained artificial neural network model must be used every time. Therefore, this may not be efficient in terms of power consumption.

According to the embodiment, the artificial neural network model trained to determine the first estimated spin-drying time may improve the learning model by using learning data having a matrix form shown in FIG. 13. In the example of FIG. 13, the first column 1310 may indicate the sensed amount of laundry, and the second to twelfth columns 1320 may indicate the actually measured first spin-drying time. According to the embodiment, the second to twelfth columns each have a value of 0 or 1, and if the value of a corresponding column is 1, this may indicate that the first spin-drying time is 1, 2, 3, 4, 5, 6, 7, 8, 9, 10, 11, and 12 minutes or longer. Each row represents the number of washing processes performed by the washing machine 100. That is, the first row represents the actually measured amount of laundry and first spin-drying time in the first washing process, and the second row represents the actually measured amount of laundry and first spin-drying time in the second washing process. Here, the expression of the first or the second just expresses the first or the second in the learning data.

According to various embodiments, the estimated spin-drying 1 time determination module 1070 may determine how many times washing process execution data are collected to generate the learning data shown in FIG. 13 in order to train the artificial neural network model. For example, the estimated drainage time determination module 1060 may generate the learning data based on M (e.g., 150) number of newly collected water supply time data. In other words, the learning data may be generated by using M number of the first spin-drying time data collected after M number of drainage time data previously used for the purpose of updating the artificial neural network model. According to another embodiment, the estimated spin-drying 1 time determination module 1070 may generate the learning data by using c (e.g., 75) number of recently collected drainage time data and b (e.g., 75) number of first spin-drying time data newly collected among the data previously used for the purpose of updating the artificial neural network model.

According to the embodiment, the estimated spin-drying 1 time determination module 1070 inputs sequentially the learning data as shown in FIG. 13 into the artificial neural network model, so that learning is performed and the artificial neural network model is updated, and the trained artificial neural network model can be more sophisticated.

According to various embodiments, the estimated spin-drying 1 time determination module 1070 can additionally recognize a balance abnormal condition. According to the embodiment, the estimated spin-drying 1 time determination module 1070 may determine that the balance is in the abnormal condition if the first estimated spin-drying time determined by the trained artificial neural network model or by another method differs by more than a predetermined value or by more than a predetermined ratio from a previously first estimated spin-drying time. For example, if an average value between the primary data set and the secondary data set or a value obtained by the trained artificial neural network model differs by more than a predetermined value, the estimated spin-drying 1 time determination module 1070 is able to recognize the abnormal condition of a spin-drying unit of the washing machine 100. For example, the estimated spin-drying 1 time determination module 1070 may recognize the balance of the washing machine 100 as being in an abnormal condition.

When the estimated spin-drying 1 time determination module 1070 predicts the balance abnormal condition, the estimated spin-drying 1 time determination module 1070 may cause the output module 1030 to provide a notification of the balance abnormal condition. For example, by the request of the estimated spin-drying 1 time determination module 1070, the output module 1030 may transmit a message informing the user that the balance of the washing machine 100 is in the abnormal condition. In addition, the output module 1030 may also transmit a message informing that the user should check whether the balance of the washing machine is in the abnormal condition while presenting a method for checking whether the balance is in the abnormal condition. Additionally, when the first estimated spin-drying time increases greater than a predetermined time (for example, 12 minutes), the balance system is recognized by the estimated spin-drying 1 time determination module 1070 as having an abnormal condition, and the estimated spin-drying 1 time determination module 1070 may transmit, to the user through the output module 1030, a message suggesting making a repair request to a service center. In this case, the use of the washing machine 100 may be stopped according to the embodiment.

Further, when the determined first estimated spin-drying time is changed differently from the previous spin-drying time, the estimated spin-drying 1 time determination module 1070 may immediately apply the changed first estimated spin-drying time. Also, the estimated spin-drying 1 time determination module 1070 may notify the user through output module 1030 that the first estimated spin-drying time is changed differently from before, and may apply the changed first estimated spin-drying time after being approved to apply the changed first estimated spin-drying time.

When the estimated spin-drying 1 time determination module 1070 uses the trained artificial neural network model, it is possible to output information on the abnormal condition together with the estimated drainage time. Alternatively, the estimated spin-drying 1 time determination module 1070 may include a separate trained artificial neural network model for determining the abnormal condition. The trained artificial neural network model for determining the abnormal condition may receive input the sensed amount of laundry and the actually measured drainage time as inputs, and may set the "balance abnormal condition", etc., as outputs.

The estimated water supply time determination module 1050 the estimated drainage time determination module 1060, and the estimated spin-drying 1 time determination module 1070 of the above-described processor 180 or the learning processor 130 may be operated in the server 200 or in the user terminal 300 not on the washing machine 100. This may be effective when the processor 180 of the washing machine 100 has considerably little computing power. In this case, the data collection module 1040 of the washing machine 100 may transmit the collected data to the server 200 or the user terminal 300 through the communication unit 110. The server 200 or the user terminal 300 may perform the above-described functions of estimated water supply time determination module 1050, the estimated drainage time determination module 1060, and the estimated spin-drying 1 time determination module 1070 based on the actually measured data obtained from the washing machine 100, may transmit the estimated water supply time, the estimated drainage time, and/or the estimated spin-drying 1 time obtained by performing the functions to the washing machine 100. The input module 1010 of the washing machine 100 may store the estimated water supply time, the estimated drainage time and/or the estimated spin-drying 1 time received from the server 200 or the user terminal 300 through the communication unit 110 in the memory 160, and may cause them to be used in the estimated washing time determination module 1020 later.

According to various embodiments, the washing machine (e.g., the washing machine 100 of FIG. 3) may comprise an input device (e.g., the input unit 120 of FIG. 3) configured to receive user input, a weight sensor (e.g., the sensing unit 140 of FIG. 3) configured to sense an amount of laundry received in the washing machine, a driver (e.g., the driving unit 170 of FIG. 3) configured to operations including water supply, drainage, washing, and spin-drying in the washing machine, an output device (e.g., the output unit 150 of FIG. 3) configured to provide washing machine status information and washing time information and at least one processor (e.g., the processor 180 or the learning processor 130 of FIG. 3) that is in communication with the driver, the input device, the weight sensor, and the output device.

According to various embodiments, the at least one processor may estimate, based on a previous setting of a previous washing operation, an estimated setting for a current washing operation, wherein the estimated setting includes a water supply time, a drainage time, and a spin-drying time, obtain the user input through the input device, obtain the amount of laundry from the weight sensor and determine, based on the estimated setting, the user input, and the amount of laundry, a washing time for the current washing operation. Here, the estimated spin-drying time may be an estimated time for the first spin-drying operation (spin-drying 1) or an estimated time for the first spin-drying operation (spin-drying 1) and the second spin-drying operation (spin-drying 2).

According to various embodiments, the at least one processor may determine, based on a most recent water supply time among a plurality of the water supply times of previous washings that correspond to the amount of laundry, the water supply time, determine, based on an average water supply time for N water supply times of the previous washings that correspond to the amount of laundry, the water supply time, wherein N is a predetermined natural number, or determine, by using a first artificial neural network model trained from the water supply times of the previous washings that correspond to the amount of laundry, the water supply time.

According to various embodiments, the at least one processor may determine, based on a most recent drainage time among a plurality of the drainage times of previous washings that correspond to the amount of laundry, the drainage time, determine, based on an average drainage time for L drainage times of the previous washings that correspond to the amount of laundry, the drainage time, where L is a predetermined natural number, or determine, by using a second artificial neural network model trained from the drainage times of the previous washings that correspond to the amount of laundry, the drainage time.

According to various embodiments, the at least one processor may determine, based on a most recent spin-drying time among a plurality of the spin-drying times of previous washings that correspond to the amount of laundry, the spin-drying time, determine, based on an average spin-drying time for M spin-drying times of the previous washings that correspond to the amount of laundry, the spin-drying time, wherein M is a predetermined natural number, or determine, by using a third artificial neural network model trained from the spin-drying times of the previous washings that correspond to the amount of laundry, the spin-drying time.

According to various embodiments, the at least one processor may train the first artificial neural network model by generating a first learning data set from applying the amount of laundry of the previous washing to the first artificial neural network, and labeling the water supply time of the previous washing in the generated first learning data set, train the second artificial neural network model by generating a second learning data set from applying the amount of laundry of the previous washing to the second artificial neural network, and labeling the drainage time of the previous washing in the generated second learning data set and train the third artificial neural network model by generating a third learning data set from applying the amount of laundry of the previous washing to the third artificial neural network, and labeling the spin-drying time of the previous washing in the generated third learning data set.

According to various embodiments, the washing machine may further comprise a communication interface (e.g., the communication unit 110 of FIG. 3) configured to communicate with an external server and/or the user terminal, and the at least one processor may obtain through the communication interface, the user input from the user terminal, and provide, through the communication interface, the washing machine status information and the washing time information to the user terminal.

According to various embodiments, the at least one processor may determine, based on the determined water supply time, that a water supply of the washing machine is in an abnormal condition, determine, based on the determined drainage time, that drainage of the washing machine is in the abnormal condition, and determine, based on the determined spin-drying time, that spin-drying of the washing machine is in the abnormal condition.

According to various embodiments, the at least one processor may determine, based on a difference between the determined water supply time and the water supply time of the previous washing being more than a predetermined value or ratio, that the water supply of the washing machine is in the abnormal condition, determine, based on a difference between the determined drainage time and the drainage time of the previous washing being more than the predetermined value or ratio, that the drainage of the washing machine is in the abnormal condition, and determine, based on a difference between the determined spin-drying time and the spin-drying time of the previous washing being more than the predetermined value or ratio, that the spin-drying of the washing machine is in the abnormal condition.

According to various embodiments, based on a determination of at least one of the water supply, the drainage, or the spin-drying of the washing machine being in the abnormal condition, the at least one processor may transmit, to the user terminal, at least one of the determined times respectively corresponding to the water supply, the drainage, and the spin-drying of the washing machine that are determined to be in the abnormal condition, obtain, from the user terminal, an approval given by the user of the transmitted at least one of the determined times, and determine, based on the determined water supply time, the determined drainage time, and the determined spin-drying time, and based on the approval of the at least one of the determined times, the washing time.

According to various embodiments, the at least one processor may determine, based on the determined water supply time being greater than a first predetermined value, that the water supply of the washing machine is in the abnormal condition, determine, based on the determined drainage time being greater than a second predetermined value, that the drainage of the washing machine is in the abnormal condition, and determine, based on the determined spin-drying time being greater than a third predetermined value, that the spin-drying of the washing machine is in an abnormal condition, and wherein, based on the at least one processor determining at least one of the water supply, the drainage, or the spin-drying of the washing machine being in the abnormal condition, the at least one processor is further configure to transmit, to the user terminal, a message that suggests making a repair request to a service center through the communication interface or the output device.

Figure 14:
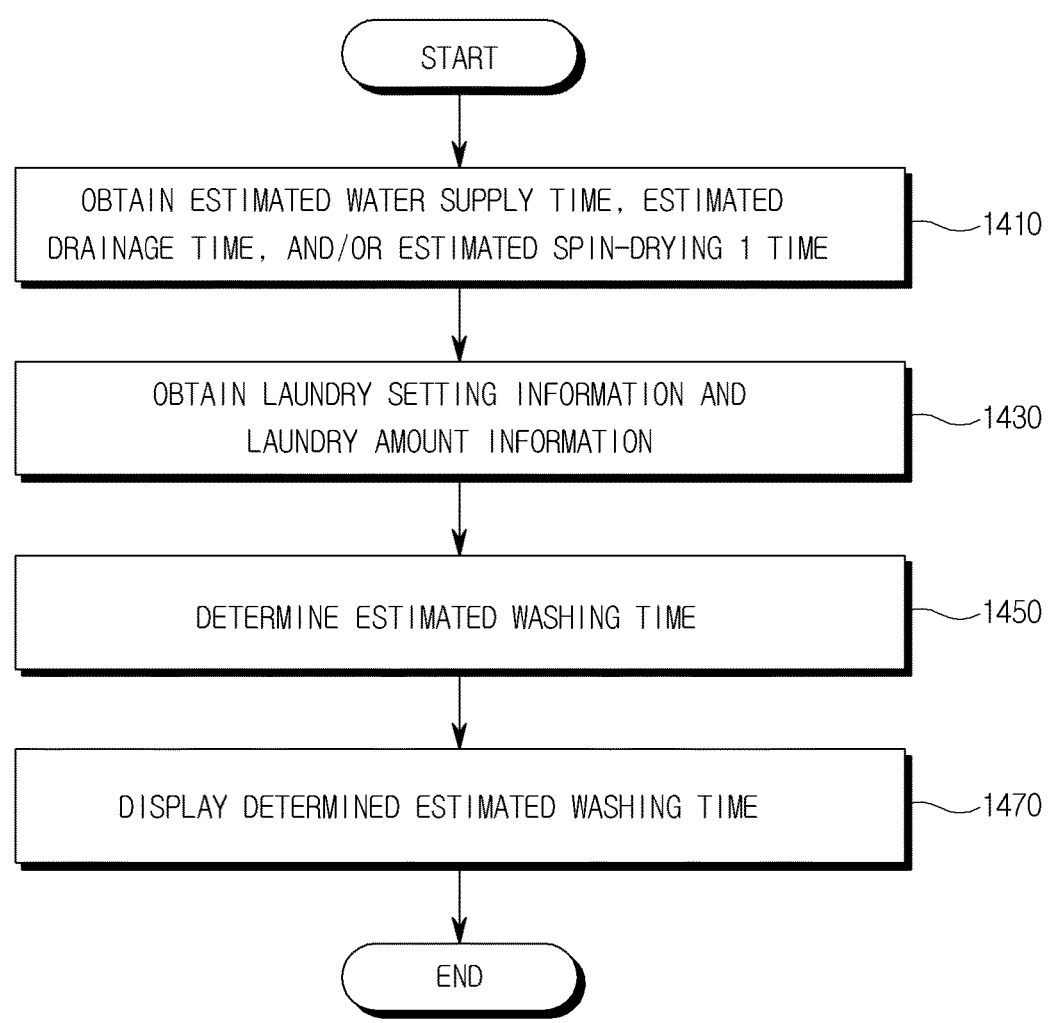
FIG. 14 is a flowchart showing operations in which the washing machine determines and displays an estimated washing time in accordance with various embodiments of the present disclosure.

FIG. 14 is a flowchart showing operations in which the washing machine 100 determines and displays the estimated washing time in accordance with various embodiments of the present disclosure. The operations according to the flowchart shown in FIG. 14 may be realized by the washing machine (e.g., the washing machine 100 of FIG. 1 or 3) or at least one processor of the washing machine (e.g., the processor 180 and the learning processor 130 of FIG. 3).

Referring to FIG. 14, in operation 1410, the washing machine 100 may obtain the estimated water supply time, the estimated drainage time, and/or the estimated spin-drying 1 time based on the laundry amount information.

Here, the estimated water supply time, the estimated drainage time, and the estimated spin-drying 1 time may have values that can be changed according to the surrounding environment of the washing machine. For example, when the water pressure of a house where the water supply is performed is low, the estimated water supply time may be long, and when the water pressure is high, the estimated water supply time may be short. In addition, when the drain port is partially clogged, the drainage time may be longer than that when the drain port is not clogged. Therefore, when the estimated water supply time, the estimated drainage time, and the estimated spin-drying 1 time have values set at the time of releasing the washing machine, change factors according to the surrounding environment where the washing machine is installed cannot be reflected. Accordingly, the estimated washing time may differ from the actual washing time. This may cause inconvenience to the user.

In order to solve this, the present invention determines the estimated water supply time, the estimated drainage time and the estimated spin-drying 1 time based on water supply time information, drainage time information and the spin-drying 1 time information obtained during the past washing. By reflecting this, the actual washing time and the estimated washing time provided by the washing machine 100 can be made to be almost similar to each other.

Accordingly, in operation 1410, the washing machine 100 may obtain the estimated water supply time, the estimated drainage time, and/or the estimated spin-drying 1 time based on the information collected during the past washing.

According to various embodiments, in operation 1430, the washing machine 100 may obtain laundry setting information input by the user and the laundry amount information sensed by the sensor. According to the embodiment, when the user inputs course information defining a series of washing process such as "daily course," the washing machine 100 may obtain a series of washing information corresponding to the corresponding course. The washing information corresponding to the course may be stored in the memory 160.

In operation 1450, the washing machine 100 may determine an estimated total washing time. The washing machine 100 may determine the order of washing (for example, water supply (4 minutes)→washing (15 minutes)→drainage (1 minute)→spin-drying 1 (3 minutes)→spin-drying 2 (2 minutes)→water supply (2 minutes)→rinsing (1 minute)→drainage (1 minute)→spin-drying 1 (3 minutes)→spin-drying 2 (2 minutes)→water supply (2 minutes)→rinsing (1 minute)→drainage (1 minute)→spin-drying 1 (10 minutes)→spin-drying 2 (3 minutes)) based on the user's washing setting and may determine an estimated time required to perform each operation based on the laundry amount information. Here, washing, rinsing, and spin-drying 2 have an unchanged execution time and may use values stored in the memory 160 at the time of releasing the washing machine as the execution time as they are. On the other hand, the water supply, drainage, and spin-drying 1 have an execution time changeable according to changes in the installation environment and surrounding environment of the washing machine and may use the value obtained in operation 1430.

Additionally, in operation 1450, the washing machine 100 may determine the estimated remaining washing time by subtracting the estimated time corresponding to the operation performed by the washing machine from the estimated total washing time as the washing progresses.

According to various embodiments, in operation 1470, the washing machine 100 may display the estimated washing time determined in operation 1450 on the control panel 123 or the user terminal 300.

Figure 15:
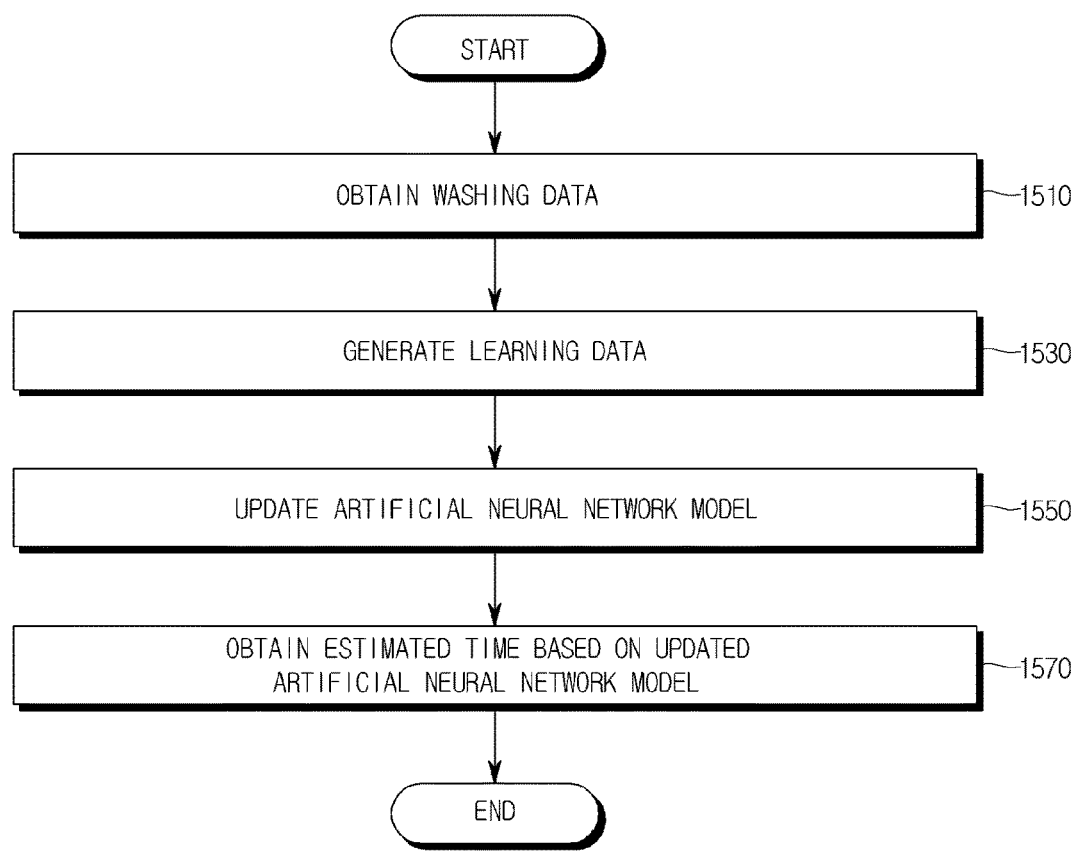
FIG. 15 is a flowchart showing operations in which the washing machine updates the artificial neural network model in accordance with various embodiments of the present disclosure.

FIG. 15 is a flowchart showing operations in which the washing machine 100 updates the artificial neural network model in accordance with various embodiments of the present disclosure. The operations according to the flowchart shown in FIG. 15 may be realized by the washing machine (e.g., the washing machine 100 of FIG. 3) or at least one processor of the washing machine (e.g., the processor 180 and the learning processor 130 of FIG. 3).

The operation flowchart of FIG. 15 may be applied to the artificial neural network model for the estimated water supply time, the artificial neural network model for the estimated drainage time, or the artificial neural network model for the estimated spin-drying 1 time respectively.

Referring to FIG. 15, in operation 1510, the washing machine 100 may obtain washing data. Each time the washing is performed, the washing machine 100 may obtain the detected amount of laundry, water supply time, drainage time, and spin-drying 1 time and store them in the memory 160.

In operation 1530, the washing machine 100 may generate the learning data for the artificial neural network model. According to the embodiment, the washing machine 100 may separately generate learning data for the artificial neural network model for the estimated water supply time, learning data for the artificial neural network model for the estimated drainage time, and learning data for the artificial neural network model for the estimated spin-drying 1 time. The sizes of the learning data for the respective artificial neural network models may be different from each other, and the type of the learning data may be what are shown in FIGS. 11 to 13.

In operation 1550, the washing machine 100 may update the artificial neural network model based on the learning data generated in operation 1530.

In operation 1570, the washing machine 100 may obtain the estimated water supply time, the estimated drainage time, or the estimated spin-drying 1 time based on the updated artificial neural network model.

The above-described operations of the flowchart shown in FIG. 15 may be performed not by the washing machine 100 but by the server (e.g., the server 200 of FIG. 1). In this case, the server 200 may obtain, in operation 1510, washing data including the detected amount of laundry, water supply time, drainage time, and spin-drying 1 time from the washing machine 100 through the communication unit 210. In addition, when the learning of the artificial neural network model is completed and updated, the estimated water supply time, the estimated drainage time, or the estimated spin-drying 1 time obtained in operation 1570 may be transferred to the washing machine 100 through the communication unit 210.

According to various embodiments, a method of operating a washing machine (for example, the washing machine 100 of FIG. 3) may estimating, based on a previous setting of a previous washing operation, an estimated setting for a current washing operation, wherein the estimated setting includes a water supply time, a drainage time, and a spin-drying time, obtaining a user input, obtaining an amount of laundry from a weight sensor of the washing machine, determining, based on the estimated setting, the user input, and the amount of laundry, a washing time for the current washing operation; and displaying the determined washing time to the user.

According to various embodiments, the determining of the water supply time comprises at least one of determining, based on a most recent water supply time among a plurality of the water supply times of previous washings that correspond to the amount of laundry, the water supply time, determining, based on an average water supply time for N water supply times of the previous washings that correspond to the amount of laundry, the water supply time, wherein N is a predetermined natural number, or determining, by using a first artificial neural network model trained from the water supply timed of the previous washings that correspond to the amount of laundry, the water supply time.

According to various embodiments, the determining of the drainage time comprises at least one of determining, based on a most recent drainage time among the plurality of the drainage times of previous washings that correspond to the amount of laundry, the drainage time, determining, based on an average drainage time for L drainage times of the previous washings that correspond to the amount of laundry, the drainage time, where L is a predetermined natural number, or determining, by using a second artificial neural network model trained from the drainage times of the previous washings that correspond to the amount of laundry, the drainage time.

According to various embodiments, the determining of the spin-drying time comprises at least one of determining, based on a most recent spin-drying time among the plurality of the spin-drying times of previous washings that correspond to the amount of laundry, the spin-drying time, determining, based on an average spin-drying time for M spin-drying times of the previous washings that correspond to the amount of laundry, the spin-drying time, wherein M is a predetermined natural number, or determining, by using a third artificial neural network model trained from the spin-drying times of the previous washings that correspond to the amount of laundry, the spin-drying time.

According to various embodiments, the method of operating the washing machine may further comprise training the first artificial neural network model by generating a first learning data set from applying the amount of laundry of the previous washing to the first artificial neural network, and labeling the water supply time of the previous washing in the generated first learning data set, training the second artificial neural network model by generating a second learning data set from applying the amount of laundry of the previous washing to the second artificial neural network and labeling the drainage time of the previous washing in the generated second learning data set, and training the third artificial neural network model by generating a third learning data set from applying the amount of laundry of the previous washing to the third artificial neural network, and labeling the spin-drying time of the previous washing in the generated third learning data set.

According to various embodiments, the method of operating the washing machine may further comprise obtaining, through a communication interface of the washing machine, the user input from a user terminal of the washing machine and providing, through the communication interface of the washing machine, the washing machine status information and the washing time information to the user terminal.

According to various embodiments, the operation method of the washing machine may further comprise determining, based on the determined water supply time, that a water supply of the washing machine is in an abnormal condition, determining, based on the determined drainage time, that a drainage of the washing machine is in the abnormal condition; and determining, based on the determined spin-drying time, that a spin-drying of the washing machine is in the abnormal condition.

According to various embodiments, the operation method of the washing machine may further comprise determining, based on the determined water supply time, that a water supply of the washing machine is in an abnormal condition, determining, based on the determined drainage time, that a drainage of the washing machine is in the abnormal condition; and determining, based on the determined spin-drying time, that a spin-drying of the washing machine is in the abnormal condition.

According to various embodiments, the operation method of the washing machine may further comprise determining, based on a difference between the determined water supply time and the water supply time of the previous washing being more than a predetermined value or ratio, that the water supply of the washing machine is in the abnormal condition, determining, based on a difference between the determined drainage time and the drainage time of the previous washing being more than the predetermined value or ratio, that the drainage of the washing machine is in the abnormal condition and determining, based on a difference between the determined spin-drying time and the spin-drying time of the previous washing being more than the predetermined value or ratio, that the spin-drying of the washing machine is in the abnormal condition.

According to various embodiments, the operation method of the washing machine may further comprise transmitting, to the user terminal, at least one of the determined times respectively corresponding to the water supply, the drainage, and the spin-drying of the washing machine that are determined to be in the abnormal condition, obtaining, from the user terminal, an approval given by the user of the transmitted at least one of the determined times and determining, based on the determined water supply time, the determined drainage time, and the determined spin-drying time, and based on the approval of the at least one of the determined times, the washing time.

According to various embodiments, the operation method of the washing machine may further comprise determining, based on the determined water supply time being greater than a first predetermined value, that the water supply of the washing machine is in the abnormal condition, determining, based on the determined drainage time being greater than a second predetermined value, that the drainage of the washing machine is in the abnormal condition, determining, based on the determined spin-drying time being greater than a third predetermined value, that the spin-drying of the washing machine is in an abnormal condition and based on the determining of at least one of the water supply, the drainage, or the spin-drying of the washing machine being in the abnormal condition, transmitting, to the user terminal, a message that suggests making a repair request to a service center through the communication interface or an output device of the washing machine.

The above-described embodiments according to the present invention may be implemented in the form of a computer program that can be executed on a computer through various components, and such a computer program can be recorded on a computer-readable medium. Here, the medium may include hardware devices specially configured to store and execute program instructions, for example, a magnetic medium such as a hard disk, a floppy disk and a magnetic tape, an optical recording medium such as a CD-ROM and DVD, a magnetic-optical medium such as a floptical disk, and a hardware device such as ROM, RAM, a flash memory and the like.

Meanwhile, the computer program may be specially designed and configured for the purpose of the present invention or may be well-known and available to those skilled in the field of computer software. Not only a machine language code which is formed by a compiler but also high-level language code which can be executed by a computer using an interpreter may be included as examples of the computer program.

Unless the order of the steps constituting the method according to the embodiment of the present invention are stated obviously or contrary thereto, the steps can be performed in a suitable order. The embodiments of the present invention are not necessarily limited to the order of description of the above steps. The use of all examples or exemplary terms (e.g., etc.) in the present invention is merely for describing the present invention in detail, and the scope of the present invention is not limited due to the examples or exemplary terms unless the present invention is limited by the claims. Also, it can be understood by those skilled in the art that various modifications, combinations, and changes can be made according to design conditions and factors within the scope of the appended claims or equivalent thereof.

Therefore, it should be noted that the spirit of the present invention is not limited to the embodiments described above and the appended claims and any variations equivalent thereto are included in the scope and spirit of the present invention.

What is claimed is:

1. A washing machine comprising:
an input device configured to receive user input;
a weight sensor configured to sense an amount of laundry received in the washing machine;
a driver configured to perform operations including water supply, drainage, washing, and spin-drying in the washing machine;
an output device configured to provide washing machine status information and washing time information; and
at least one processor that is in communication with the driver, the input device, the weight sensor, and the output device,
wherein the at least one processor is configured to:
estimate, based on a previous setting of a previous washing operation, an estimated setting for a current washing operation, the estimated setting including a water supply time, a drainage time, and a spin-drying time,
obtain the user input through the input device,
obtain the amount of laundry from the weight sensor,
determine, based on the estimated setting, the user input, and the amount of laundry, a washing time for the current washing operation, and
determine, based on a difference between the estimated setting for the current washing operation and the previous setting of the previous washing operation being greater than a predetermined value or ratio, that the washing machine is in an abnormal condition indicating that at least one condition of the washing machine is impairing performance of the washing machine.

2. The washing machine of claim 1, wherein the at least one processor is further configured to:
determine, based on a most recent water supply time among a plurality of the water supply times of previous washings that correspond to the amount of laundry, the water supply time,
determine, based on an average water supply time for N water supply times of the previous washings that correspond to the amount of laundry, the water supply time, wherein N is a predetermined natural number, or
determine, by using a first artificial neural network model trained from the water supply times of the previous washings that correspond to the amount of laundry, the water supply time.

3. The washing machine of claim 2, wherein the at least one processor is further configured to:
determine, based on a most recent drainage time among a plurality of the drainage times of previous washings that correspond to the amount of laundry, the drainage time,
determine, based on an average drainage time for L drainage times of the previous washings that correspond to the amount of laundry, the drainage time, where L is a predetermined natural number, or
determine, by using a second artificial neural network model trained from the drainage times of the previous washings that correspond to the amount of laundry, the drainage time.

4. The washing machine of claim 3, wherein the at least one processor is further configured to:
determine, based on a most recent spin-drying time among a plurality of the spin-drying times of previous washings that correspond to the amount of laundry, the spin-drying time,
determine, based on an average spin-drying time for M spin-drying times of the previous washings that correspond to the amount of laundry, the spin-drying time, wherein M is a predetermined natural number, or
determine, by using a third artificial neural network model trained from the spin-drying times of the previous washings that correspond to the amount of laundry, the spin-drying time.

5. The washing machine of claim 4, wherein the at least one processor is further configured to:
train the first artificial neural network model by:
generating a first learning data set from applying the amount of laundry of the previous washing to the first artificial neural network, and
labeling the water supply time of the previous washing in the generated first learning data set,
train the second artificial neural network model by:
generating a second learning data set from applying the amount of laundry of the previous washing to the second artificial neural network, and
labeling the drainage time of the previous washing in the generated second learning data set, and
train the third artificial neural network model by:
generating a third learning data set from applying the amount of laundry of the previous washing to the third artificial neural network, and
labeling the spin-drying time of the previous washing in the generated third learning data set.

6. The washing machine of claim 4, further comprising a communication interface configured to communicate with an external server and/or a user terminal,
wherein the at least one processor is configured to:
obtain, through the communication interface, the user input from the user terminal, and
provide, through the communication interface, the washing machine status information and the washing time information to the user terminal.

7. The washing machine of claim 6, wherein the at least one processor is further configured to:
determine, based on the determined water supply time, that a water supply of the washing machine is in the abnormal condition,
determine, based on the determined drainage time, that drainage of the washing machine is in the abnormal condition, and
determine, based on the determined spin-drying time, that spin-drying of the washing machine is in the abnormal condition.

8. The washing machine of claim 7, wherein the at least one processor is further configured to:
determine, based on a difference between the determined water supply time and the water supply time of the previous washing being greater than a predetermined value or ratio, that the water supply of the washing machine is in the abnormal condition,
determine, based on a difference between the determined drainage time and the drainage time of the previous washing being greater than the predetermined value or ratio, that the drainage of the washing machine is in the abnormal condition, and
determine, based on a difference between the determined spin-drying time and the spin-drying time of the previous washing being greater than the predetermined value or ratio, that the spin-drying of the washing machine is in the abnormal condition.

9. The washing machine of claim 8, wherein, based on a determination of at least one of the water supply, the drainage, or the spin-drying of the washing machine being in the abnormal condition, the at least one processor is further configured to:

transmit, to the user terminal, at least one of the determined times respectively corresponding to the water supply, the drainage, and the spin-drying of the washing machine that are determined to be in the abnormal condition, obtain, from the user terminal, an approval given by the user of the transmitted at least one of the determined times, and determine, based on (i) the determined water supply time, the determined drainage time, and the determined spin-drying time and (ii) the approval of the at least one of the determined times, the washing time.

10. The washing machine of claim 7, wherein the at least one processor is further configured to:

determine, based on the determined water supply time being greater than a first predetermined value, that the water supply of the washing machine is in the abnormal condition, determine, based on the determined drainage time being greater than a second predetermined value, that the drainage of the washing machine is in the abnormal condition, and determine, based on the determined spin-drying time being greater than a third predetermined value, that the spin-drying of the washing machine is in the abnormal condition, and wherein, based on the at least one processor determining at least one of the water supply, the drainage, or the spin-drying of the washing machine being in the abnormal condition, the at least one processor is further configure to transmit, to the user terminal, a message that suggests making a repair request to a service center through the communication interface or the output device.

11. A method of operating a washing machine comprising a driver configured to perform operations including water supply, drainage, washing, and spin-drying, the method comprising:

estimating, by at least one processor of the washing machine, based on a previous setting of a previous washing operation, an estimated setting for a current washing operation, the estimated setting including a water supply time, a drainage time, and a spin-drying time;

obtaining, by the at least one processor, a user input through an input device of the washing machine;

obtaining, by the at least one processor, an amount of laundry from a weight sensor of the washing machine;

determining, by the at least one processor, based on the estimated setting, the user input, and the amount of laundry, a washing time for the current washing operation;

determining, based on a difference between the estimated setting for the current washing operation and the previous setting of the previous washing operation being greater than a predetermined value or ratio, that the washing machine is in an abnormal condition indicating that at least one condition of the washing machine is impairing performance of the washing machine; and providing, by the at least one processor, the determined washing time and whether the washing machine is in the abnormal condition or not to the user using an output device of the washing machine, the output device configured to provide washing machine status information and washing time information.

12. The operation method of claim 11, wherein determining, by the at least one processor, the water supply time comprises at least one of:

determining, by the at least one processor, based on a most recent water supply time among a plurality of the water supply times of previous washings that correspond to the amount of laundry, the water supply time, determining, by the at least one processor, based on an average water supply time for N water supply times of the previous washings that correspond to the amount of laundry, the water supply time, wherein N is a predetermined natural number, or determining, by the at least one processor, by using a first artificial neural network model trained from the water supply timed of the previous washings that correspond to the amount of laundry, the water supply time.

13. The operation method of claim 12, wherein determining, by the at least one processor, the drainage time comprises at least one of:

determining, by the at least one processor, based on a most recent drainage time among the plurality of the drainage times of previous washings that correspond to the amount of laundry, the drainage time, determining, by the at least one processor, based on an average drainage time for L drainage times of the previous washings that correspond to the amount of laundry, the drainage time, where L is a predetermined natural number, or determining, by the at least one processor, by using a second artificial neural network model trained from the drainage times of the previous washings that correspond to the amount of laundry, the drainage time.

14. The operation method of claim 13, wherein determining, by the at least one processor, the spin-drying time comprises at least one of:

determining, by the at least one processor, based on a most recent spin-drying time among the plurality of the spin-drying times of previous washings that correspond to the amount of laundry, the spin-drying time, determining, by the at least one processor, based on an average spin-drying time for M spin-drying times of the previous washings that correspond to the amount of laundry, the spin-drying time, wherein M is a predetermined natural number, or determining, by the at least one processor, by using a third artificial neural network model trained from the spin-drying times of the previous washings that correspond to the amount of laundry, the spin-drying time.

15. The operation method of claim 14, further comprising:

training, by the at least one processor, the first artificial neural network model by:

generating a first learning data set from applying the amount of laundry of the previous washing to the first artificial neural network, and labeling the water supply time of the previous washing in the generated first learning data set;

training, by the at least one processor, the second artificial neural network model by:

generating a second learning data set from applying the amount of laundry of the previous washing to the second artificial neural network, and labeling the drainage time of the previous washing in the generated second learning data set; and training, by the at least one processor, the third artificial neural network model by:

generating a third learning data set from applying the amount of laundry of the previous washing to the third artificial neural network, and labeling the spin-drying time of the previous washing in the generated third learning data set.

16. The operation method of claim 14, further comprising:

obtaining, by the at least one processor, through a communication interface of the washing machine, the user input from a user terminal of the washing machine; and providing, by the at least one processor, through the communication interface of the washing machine, the washing machine status information and the washing time information to the user terminal.

17. The operation method of claim 16, further comprising:

determining, by the at least one processor, based on the determined water supply time, that a water supply of the washing machine is in the abnormal condition;

determining, by the at least one processor, based on the determined drainage time, that a drainage of the washing machine is in the abnormal condition; and determining, by the at least one processor, based on the determined spin-drying time, that a spin-drying of the washing machine is in the abnormal condition.

18. The operation method of claim 17, further comprising:

determining, by the at least one processor, based on a difference between the determined water supply time and the water supply time of the previous washing being greater than a predetermined value or ratio, that the water supply of the washing machine is in the abnormal condition;

determining, by the at least one processor, based on a difference between the determined drainage time and the drainage time of the previous washing being greater than the predetermined value or ratio, that the drainage of the washing machine is in the abnormal condition; and determining, by the at least one processor, based on a difference between the determined spin-drying time and the spin-drying time of the previous washing being greater than the predetermined value or ratio, that the spin-drying of the washing machine is in the abnormal condition.

19. The operation method of claim 18, further comprising:

transmitting, by the at least one processor, to the user terminal, at least one of the determined times respectively corresponding to the water supply, the drainage, and the spin-drying of the washing machine that are determined to be in the abnormal condition;

obtaining, by the at least one processor, from the user terminal, an approval given by the user of the transmitted at least one of the determined times; and determining, by the at least one processor, based on (i) the determined water supply time, the determined drainage time, and the determined spin-drying time and (ii) the approval of the at least one of the determined times, the washing time.

20. The operation method of claim 17, further comprising:

determining, by the at least one processor, based on the determined water supply time being greater than a first predetermined value, that the water supply of the washing machine is in the abnormal condition;

determining, by the at least one processor, based on the determined drainage time being greater than a second predetermined value, that the drainage of the washing machine is in the abnormal condition;

determining, by the at least one processor, based on the determined spin-drying time being greater than a third predetermined value, that the spin-drying of the washing machine is in the abnormal condition; and based on the determining of at least one of the water supply, the drainage, or the spin-drying of the washing machine being in the abnormal condition, transmitting, by the at least one processor, to the user terminal, a message that suggests making a repair request to a service center through the communication interface or an output device of the washing machine.

\* \* \* \* \*